US007013755B2

(12) United States Patent
Muraoka

(10) Patent No.: US 7,013,755 B2
(45) Date of Patent: Mar. 21, 2006

(54) BICYCLE PEDAL ASSEMBLY

(75) Inventor: Tsutomu Muraoka, Osaka (JP)

(73) Assignee: Shimano Inc., Osaka (JP)

( * ) Notice: Subject to any disclaimer, the term of this patent is extended or adjusted under 35 U.S.C. 154(b) by 129 days.

(21) Appl. No.: 10/712,256

(22) Filed: Nov. 14, 2003

(65) Prior Publication Data

US 2005/0103153 A1 May 19, 2005

(51) Int. Cl.
*B62M 3/08* (2006.01)
*G05G 1/14* (2006.01)
(52) U.S. Cl. ........................ 74/594.6; 36/131
(58) Field of Classification Search ............... 74/594.6, 74/594.7; 36/131, 132, 134
See application file for complete search history.

(56) References Cited

U.S. PATENT DOCUMENTS

| 5,131,291 A | 7/1992 | Beyl |
| 5,419,218 A | 5/1995 | Romano |
| 6,119,551 A | 9/2000 | Ueda |
| 6,151,989 A | 11/2000 | Ueda |
| 6,282,984 B1 | 9/2001 | Chen |
| 6,446,529 B1 | 9/2002 | Tanaka |
| 2003/0051575 A1 | 3/2003 | Muraoka |

FOREIGN PATENT DOCUMENTS

| EP | 0485956 A1 | 5/1992 |
| EP | 0826586 A1 | 3/1998 |
| EP | 0999122 A2 | 5/2000 |

*Primary Examiner*—Chong H. Kim
(74) *Attorney, Agent, or Firm*—Shinjyu Global IP Counselors, LLP

(57) ABSTRACT

A bicycle pedal assembly includes a pair of pedals and a pair of cleats. The cleats are configured and arranged to selectively cooperate with the right and left bicycle pedals such that two different release forces can be attained using a single pair of cleats. The pedal includes a body that rotates about a shaft and a front and rear clamping members are coupled to opposite ends of the pedal body. Also, the front and rear clamping members are preferably pivotally coupled to the pedal body.

17 Claims, 17 Drawing Sheets

FIRST(SMALL)PREDETERMINED OUTWARD TWISTING FORCE

SECOND(LARGE)PREDETERMINED OUTWARD TWISTING FORCE

FIRST (SMALL) PREDETERMINED OUTWARD TWISTING FORCE

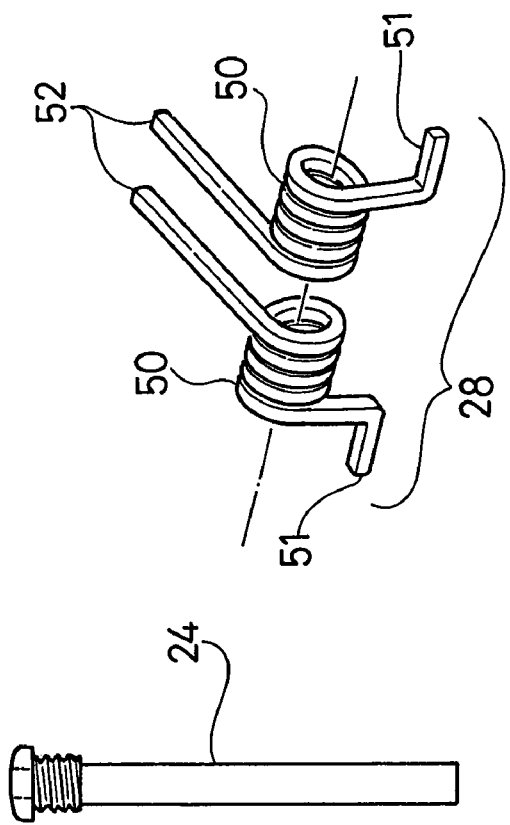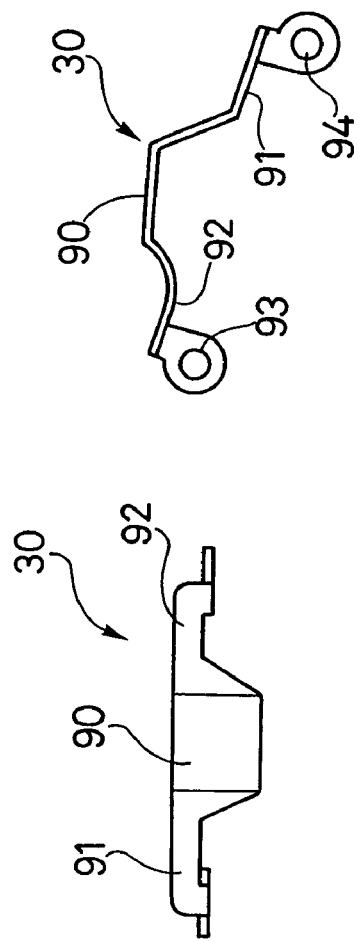

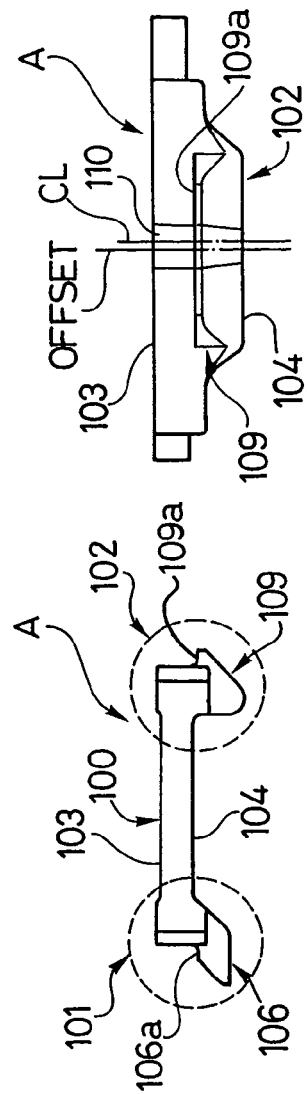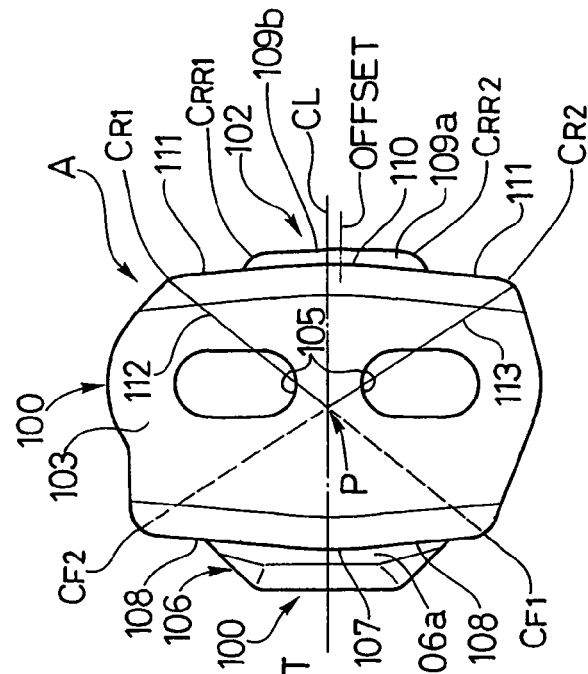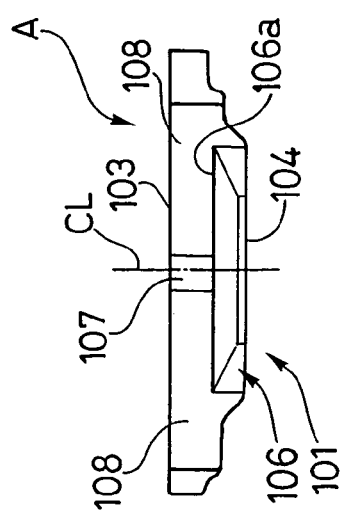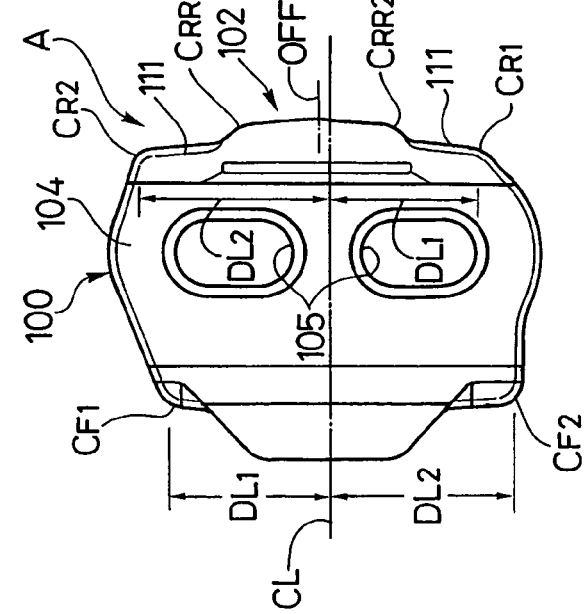

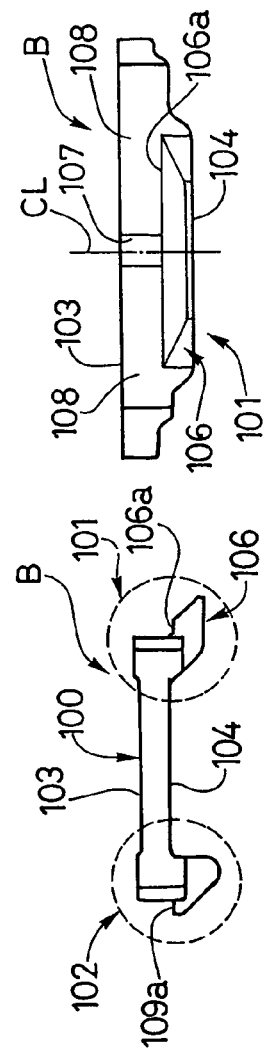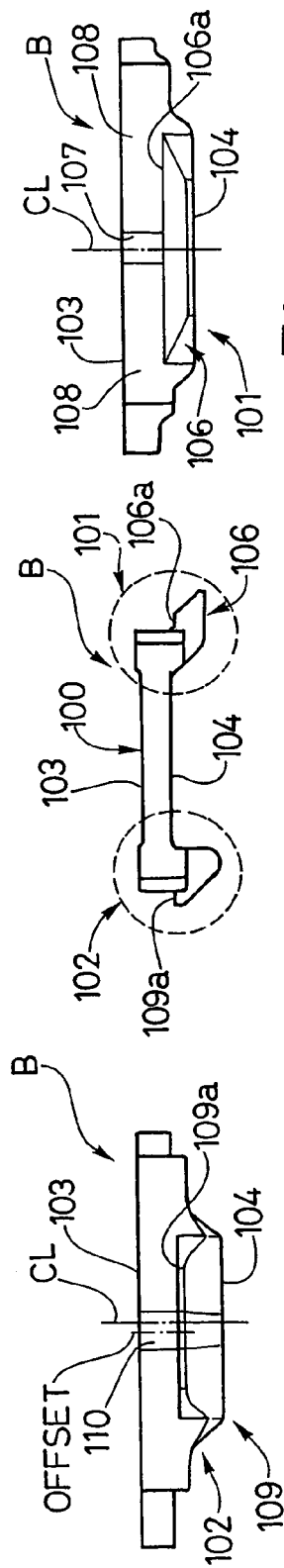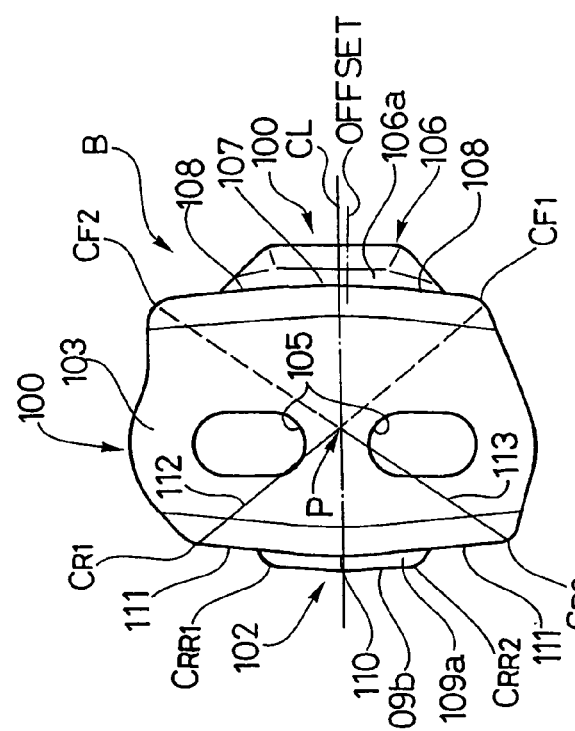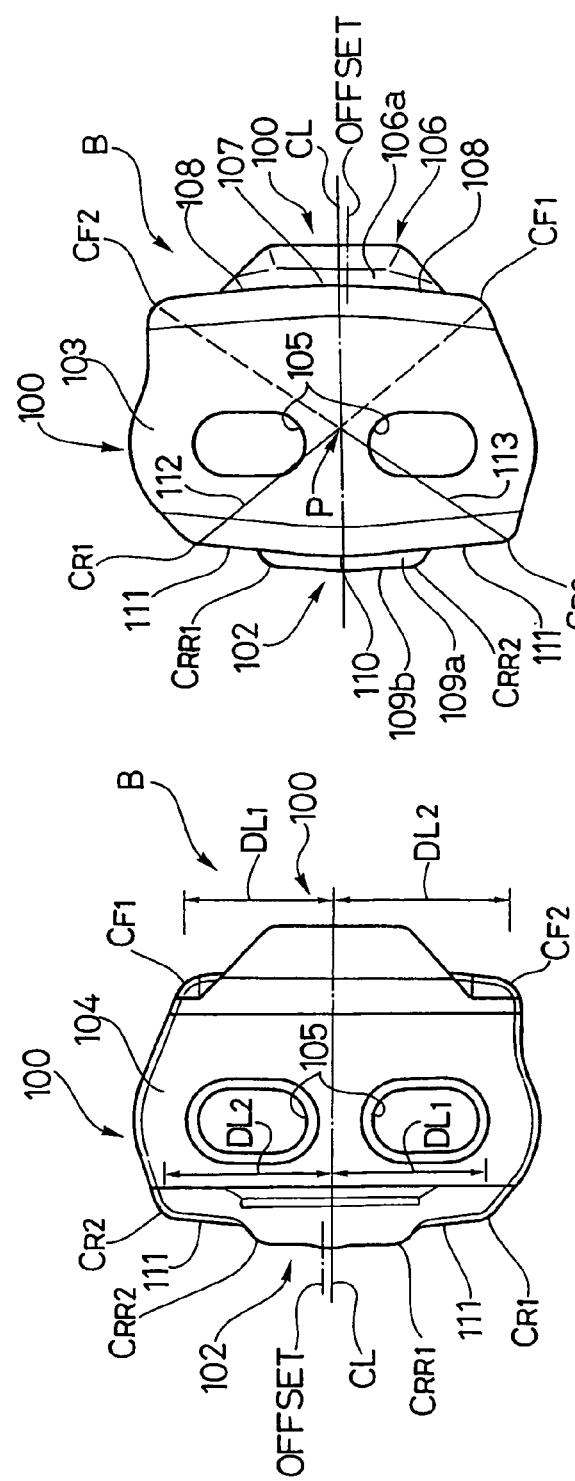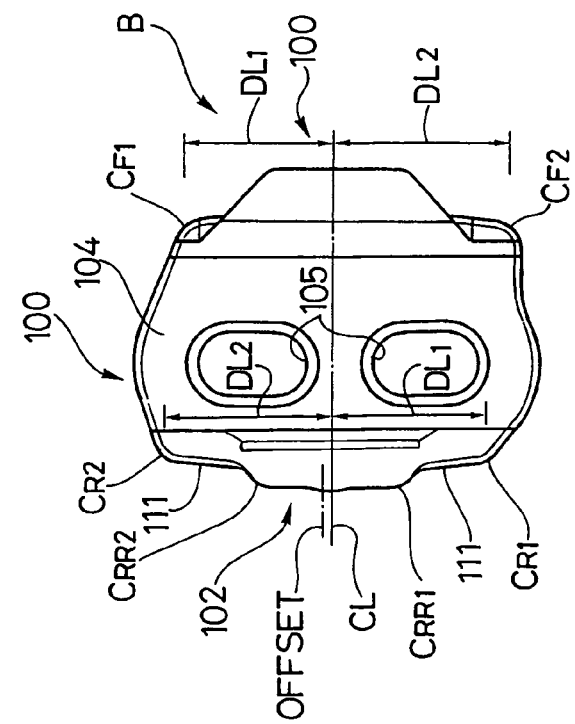

BICYCLE PEDAL ASSEMBLY

BACKGROUND OF THE INVENTION

1. Field of the Invention

This invention generally relates to a bicycle pedal assembly. More specifically, the present invention relates clipless or step-in bicycle pedal assembly, which has cleats that are releasably coupled to a pair of bicycle pedals.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle. One component that has been extensively redesigned is the bicycle pedal.

In recent years, bicycle pedals have been designed for specific purposes such as for pleasure, off road biking, road racing, etc. One particular type of bicycle pedal, which is gaining more popularity, is the step-in or clipless pedal, which releasably engages a cleat secured to the sole of a cyclist's shoe. The clipless pedal has a pedal spindle that can be mounted on the crank of a bicycle, a pedal body that is rotatably supported on this pedal spindle, and a cleat engagement mechanism. In an off road bicycle pedal a cleat engagement mechanism is formed on both sides of the pedal body for engaging a cleat. A road-racing pedal, on the other hand, typically only has a cleat engagement mechanism on one side of the pedal body. In either case, in these types of bicycle pedals, the rider steps onto the pedal and the cleat engagement mechanism automatically grips on to the cleat secured to the bottom of the cyclist's shoe.

With this type of step-in or clipless pedal, the shoe and the pedal are in a state of constant engagement when the cleat is engaged in the cleat clamping members, so the pedaling force can be transmitted efficiently to the pedals. As a result, step-in or clipless pedals are widely employed on racing bicycles used in road racing and mountain bike racing.

When attaching the cyclist's shoe to the step-in or clipless pedal via the cleat, the cyclist moves the shoe obliquely downwardly and forwardly relative to the pedal body such that the front end of the cleat engages a front hook or clamping member of the pedal body. Once the front end of the cleat is engaged with the front hook of the pedal body, the cyclist places the rear end of the cleat in contact with a guide portion of the rear hook or clamping member of the pedal body. In this position, the cyclist presses the shoe downwardly against the pedal to cause the rear hook or clamping member to initially pivot rearwardly against the force of a spring to move the rear hook or clamping member to a cleat releasing position. The rear end of the cleat then enters a position opposite a back face of the rear hook or clamping member. Then, the rear hook or clamping member returns under the force of a biasing member or spring so that the rear hook or clamping member engages the rear end of the cleat. This engagement fixes the cyclist's shoe to the pedal via the cleat.

When releasing the shoe from the pedal, the cyclist will typically turn the shoe about an axis perpendicular or approximately perpendicular to the tread of the pedal, using the front end of the cleat as a pivoting point. As a result of this pivoting action, the rear nook or clamping member is pivoted rearwardly against the force of the spring to a cleat releasing position to release the shoe. It is important that the cleat does not inadvertently release the pedal during normal pedaling. Some of these prior step-in or clipless pedals can inadvertently release the cleat during normal pedaling if the spring force on the rear clamping member is set too low. However, if the spring force on the rear clamping member is set too high, the cleat may not release from the pedal properly. This could result in the rider's shoe not properly releasing from the pedal at the desired application of force because the rider's shoe either releases too easily from the pedal or does not release at the proper time. Thus, some of these step-in or clipless pedals and the cleats for these pedals are designed with adjustment mechanisms to change the release force required for the rider to disengage the cleat from the pedal. However, these adjustment mechanisms increase the overall cost of the pedals. In particular, these adjustment mechanisms can be complicated and expensive to manufacture and assemble.

In view of the above, there exists a need for an improved bicycle pedal assembly that takes into account at least some of the above mentioned problems in the prior art. This invention addresses this need in the prior art as well as other needs, which will become apparent to those skilled in the art from this disclosure.

SUMMARY OF THE INVENTION

One object of the present invention is to provide a bicycle pedal assembly that is configured and arranged such that the release force can be adjusted without an adjustment mechanism for the clamping members.

Another object of the present invention is to provide a step-in bicycle pedal assembly that is relatively lightweight and malfunction free.

Yet another object of the present invention is to provide a step-in bicycle pedal assembly that is relatively simple and inexpensive to manufacture.

The foregoing objects can basically be achieved by providing a bicycle pedal assembly comprising a bicycle pedal and a pair of bicycle cleat. The bicycle pedal basically comprises a pedal shaft, a pedal body, a front clamping member and a rear clamping member. The pedal shaft has a center rotational axis. The pedal body is rotatably coupled to the pedal shaft about the center rotational axis of the pedal shaft. The pedal body has a first end and a second end with a center plane extending between the first and second ends and passing through the center rotational axis of the pedal shaft. The front clamping member is coupled to the first end of the pedal body. The front clamping member has a front cleat engagement surface facing towards the center plane of the pedal body. The rear clamping member is coupled to the second end of the pedal body. The rear clamping member has a rear cleat engagement surface facing towards the center plane of the pedal body. The first bicycle shoe cleat includes first front and rear attachment portions configured and arranged to cooperate with the front and rear clamping members to release the first bicycle shoe cleat from a cleat engaged position to a cleat released position upon application of a first predetermined amount of outward twisting force. The second bicycle shoe cleat includes second front and rear attachment portions configured and arranged to cooperate with the front and rear clamping members to release the second bicycle shoe cleat from the cleat engaged position to the cleat released position upon application of a second predetermined amount of outward twisting force that is higher than the first predetermined amount of outward twisting force.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 15 is a side perspective view of one of the pivot pins for pivotally coupling one of the clamping members to the bicycle pedal bodies illustrated in FIGS. 2–5;

FIG. 16 is a perspective view of one of the biasing members (a pair of torsion springs) for urging one pair of the clamping members of the bicycle pedal assemblies to the rest or cleat engaging positions;

FIG. 17 is a top plan view first side elevational view of one of the pedal body covers for the bicycle pedal assemblies illustrated in FIGS. 2–5;

FIG. 18 is a side elevational view of the pedal body cover illustrated FIG. 17 for the bicycle pedal assemblies illustrated in FIGS. 2–5;

FIG. 29 is a front end elevational view of the first cleat for use with both the right bicycle pedal and the left bicycle pedal illustrated in FIGS. 2–5

FIG. 30 is a side elevational view of the first cleat illustrated in FIG. 29 for use with both the right bicycle pedal and the left bicycle pedal illustrated in FIGS. 2–5;

FIG. 31 is a rear end elevational view of the first cleat illustrated in FIGS. 29 and 30 for use with both the right bicycle pedal and the left bicycle pedal illustrated in FIGS. 2–5;

FIG. 32 is a bottom plan view of the first cleat illustrated in FIGS. 29–31 for use with both the right bicycle pedal and the left bicycle pedal illustrated in FIGS. 2–5;

FIG. 33 is a top plan view of the first cleat illustrated in FIGS. 29–32 for use with both the right bicycle pedal and the left bicycle pedal illustrated in FIGS. 2–5;

FIG. 34 is a front end elevational view of the second cleat for use with both the right bicycle pedal and the left bicycle pedal illustrated in FIGS. 2–5;

FIG. 35 is a side elevational view of the second cleat illustrated in FIG. 29 for use with both the right bicycle pedal and the left bicycle pedal illustrated in FIGS. 2–5;

FIG. 36 is a rear end elevational view of the second cleat illustrated in FIGS. 34 and 35 for use with both the right bicycle pedal and the left bicycle pedal illustrated in FIGS. 2–5;

FIG. 37 is a bottom plan view of the second cleat illustrated in FIGS. 34–36 for use with both the right bicycle pedal and the left bicycle pedal illustrated in FIGS. 2–5;

FIG. 38 is a top plan view of the second cleat illustrated in FIGS. 34–37 for use with both the right bicycle pedal and the left bicycle pedal illustrated in FIGS. 2–5;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
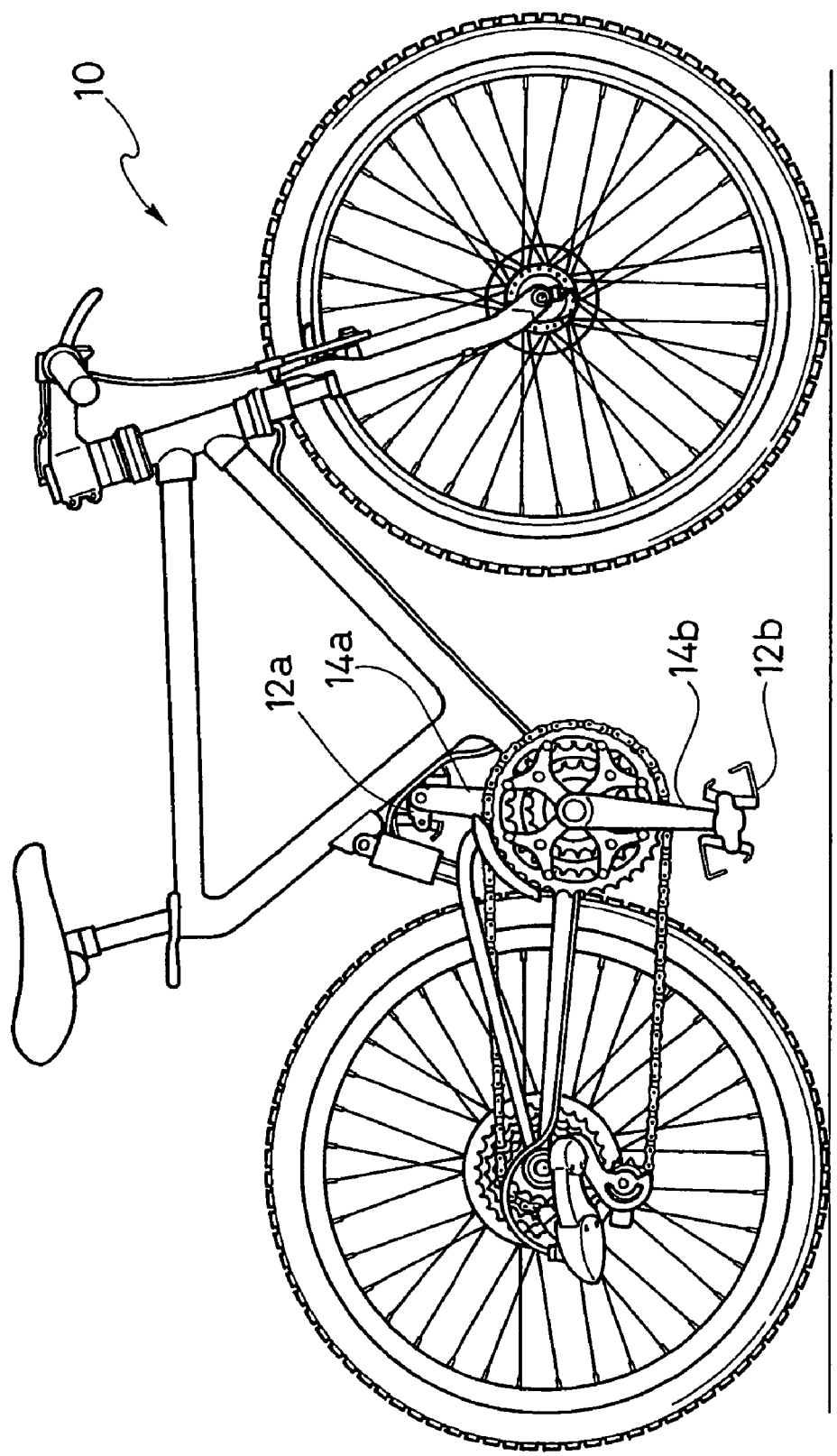
FIG. 1 is a side elevational view of a bicycle that is equipped with a pair of bicycle pedals in accordance with a preferred embodiment of the present invention.

Referring initially to FIG. 1, a bicycle 10 is illustrated that is equipped with a left bicycle pedal 12a and a right bicycle pedal 12b in accordance with a first embodiment of the present invention. The bicycle the pedals 12a and 12b are fixedly coupled to a pair of bicycle crank arms 14a and 14b of a bicycle 10 for rotation therewith.

As seen in FIGS. 2–5, the left and right bicycle pedals 12a and 12b selectively engage a pair of cleats A and B. Thus, the left and right bicycle pedals 12a and 12b and the cleats A and B form a bicycle pedal assembly in accordance with a first embodiment of the present invention. The first and second bicycle shoe cleats A and B are preferably fixedly coupled to a pair of bicycle shoes in a conventional manner (e.g., using a pair of screws for each cleat) to releasably couple the cyclist's feet to the bicycle pedals 12a and 12b.

In the illustrated embodiment, the bicycle pedals 12a and 12b are especially designed for use with off-road bicycles as opposed to use with a road bicycle. However, it will be apparent to those skilled in the art from this disclosure that the features of the bicycle pedals 12a and 12b can be used in the construction of a road type of bicycle pedal if needed and/or desired. In other words, it will be apparent that the bicycle pedals 12a and 12b can be designed such that the first and second bicycle shoe cleats A and B can only be coupled to one side of the bicycle pedals 12a and 12b.

Specifically, the cleats A and B are engaged with the bicycle pedals 12a and 12b by pressing the cleats A and B into the pedals 12a and 12b with a forward and downward motion. This releasably locks the cleats A and B to the pedals 12a and 12b. The cleats A and B can be released from the pedals 12a and 12b by twisting the heel of the shoe to the outside of pedals 12a and 12b as discussed below in more detail.

Figure 2:
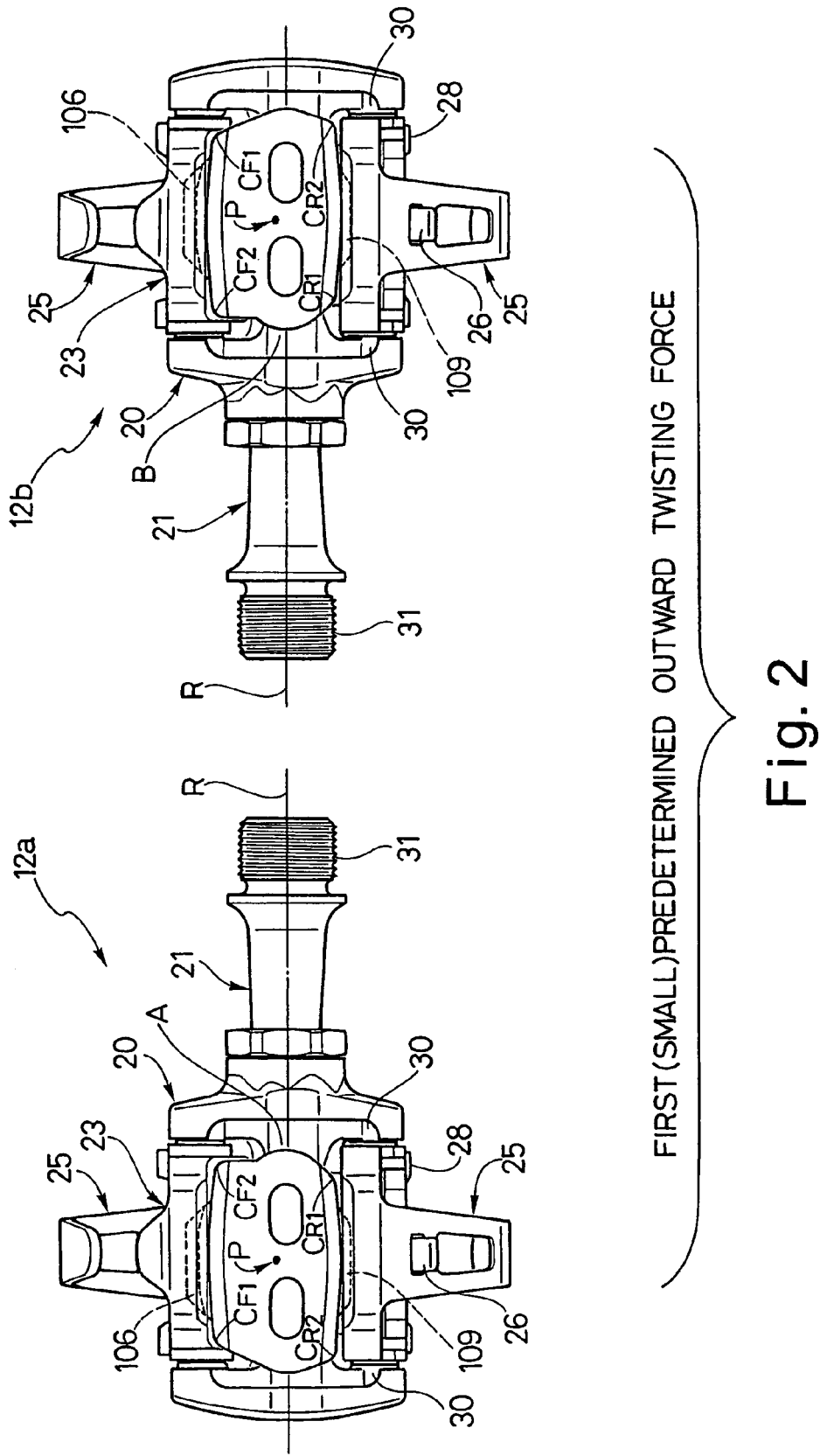
FIG. 2 is a top plan view of a pair of bicycle pedal assemblies in a first arrangement with the cleats being arranged to produce a low cleat release force in accordance with the preferred embodiment of the present invention.
Figure 3:
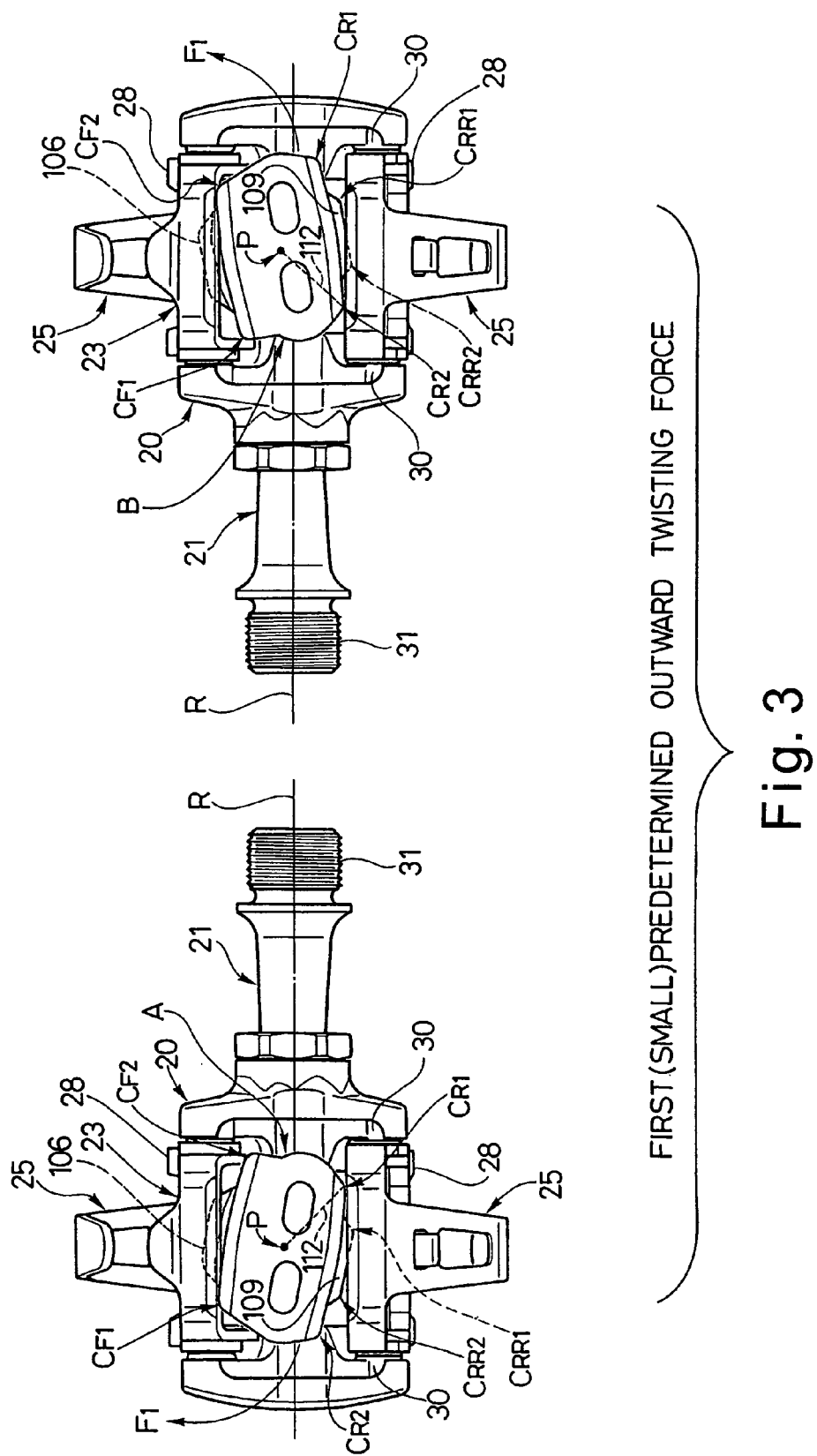
FIG. 3 is a top plan view of the pair of bicycle pedal assemblies illustrated in FIG. 2 with the cleats being rotated by a first predetermined outward twisting force.

The first and second bicycle shoe cleats A and B are configured and arranged to selectively cooperate with the bicycle pedals 12a and 12b such that two different release forces can be attained using a single pair of cleats A and B. In particular, as illustrated in FIGS. 2 and 3, the first and second bicycle shoe cleats A and B are configured and arranged to release upon application of a first predetermined amount of outward twisting force F1 when the first bicycle shoe cleat A is engaged with the left bicycle pedal 12a and the second bicycle shoe cleat B is engaged with the right bicycle pedal 12b.

Figure 4:
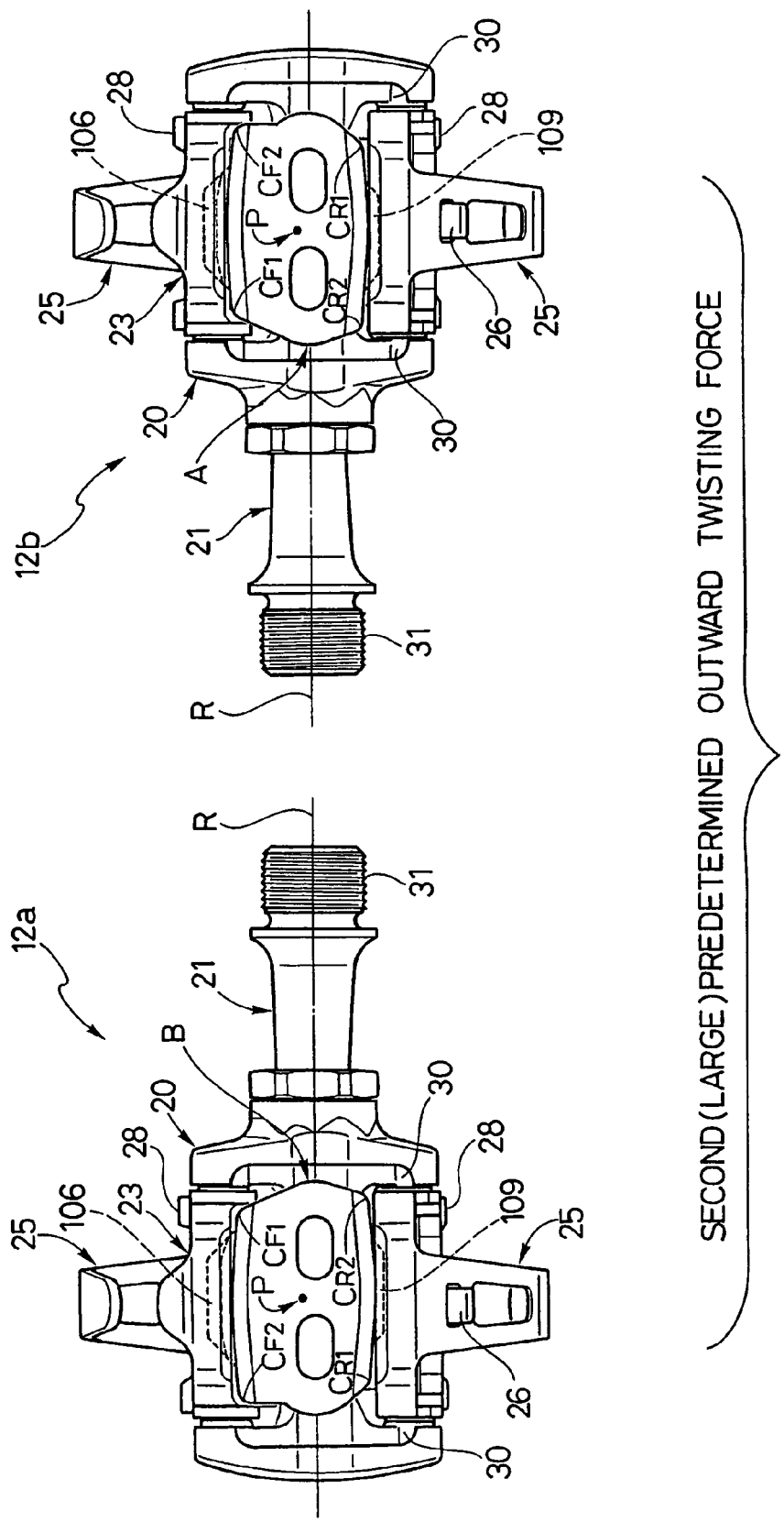
FIG. 4 is a top plan view of the pair of bicycle pedal assemblies in a second arrangement with the cleats being arranged to produce a high cleat release force in accordance with the preferred embodiment of the present invention.
Figure 5:
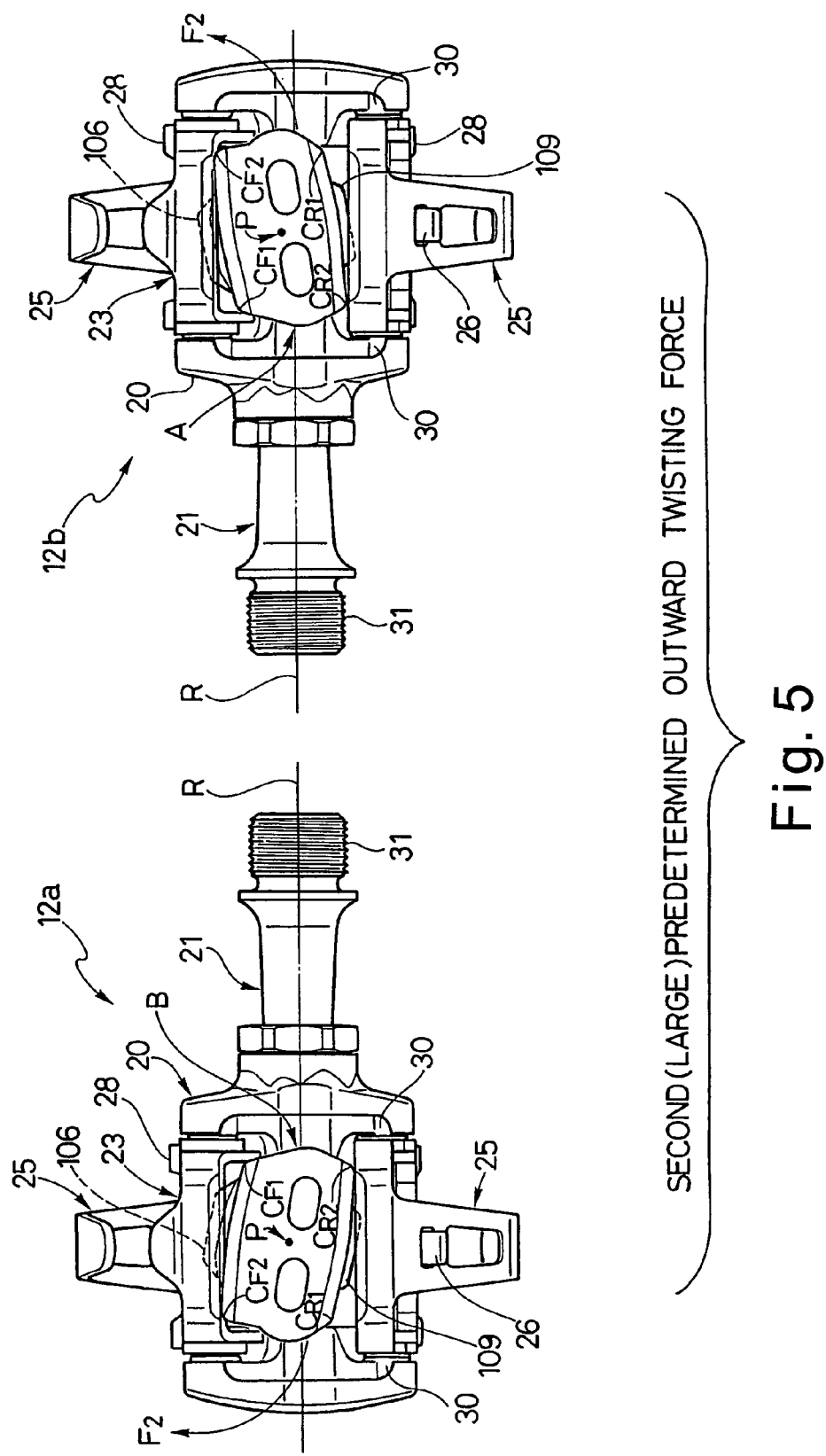
FIG. 5 is a top plan view of the pair of bicycle pedal assemblies illustrated in FIG. 4 with the cleats being rotated by a second predetermined outward twisting force.

However, as illustrated in FIGS. 4 and 5, the first and second bicycle shoe cleats A and B are configured and arranged to release upon application of a second predetermined amount of outward twisting force F2 that is higher than the first predetermined amount of outward twisting force F1 when the first bicycle shoe cleat A is engaged with the right bicycle pedal 12b and the second bicycle shoe cleat B is engaged with the left bicycle pedal 12a.

As seen in FIGS. 2–5, the left bicycle pedal 12a is a mirror image of the right bicycle pedal 12b. It will be apparent to those skilled in the art from this disclosure that the description of the left bicycle pedal 12a also applies to the right bicycle pedal 12b and vice a versa. Thus, the same reference numerals will be used to describe both the left and right pedals 12a and 12b. Moreover, the left bicycle pedal 12a will not be discussed or illustrated in further detail herein for the sake of brevity.

Figure 8:
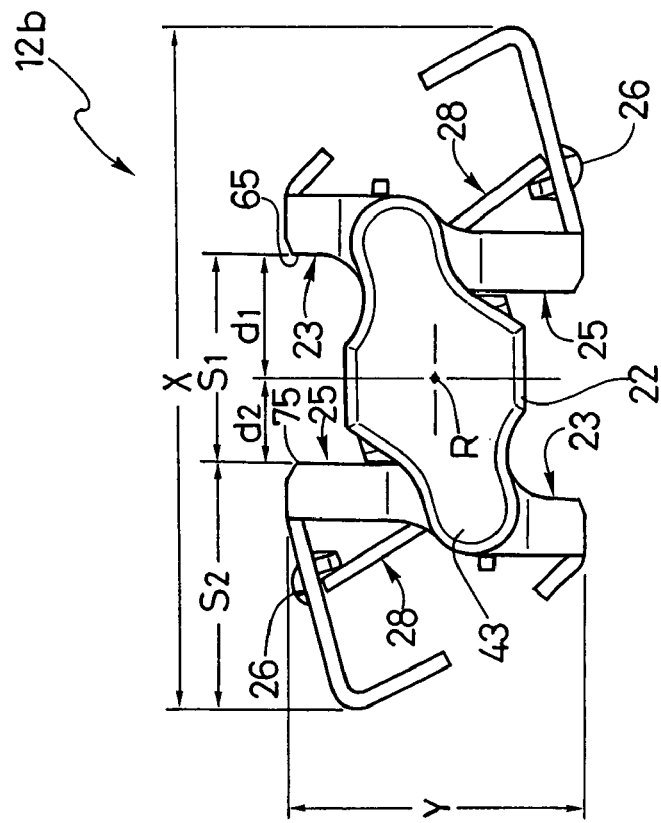
FIG. 8 is an outside elevational view of the right bicycle pedal illustrated in FIGS. 2–7, without the cleat coupled thereto.
Figure 7:
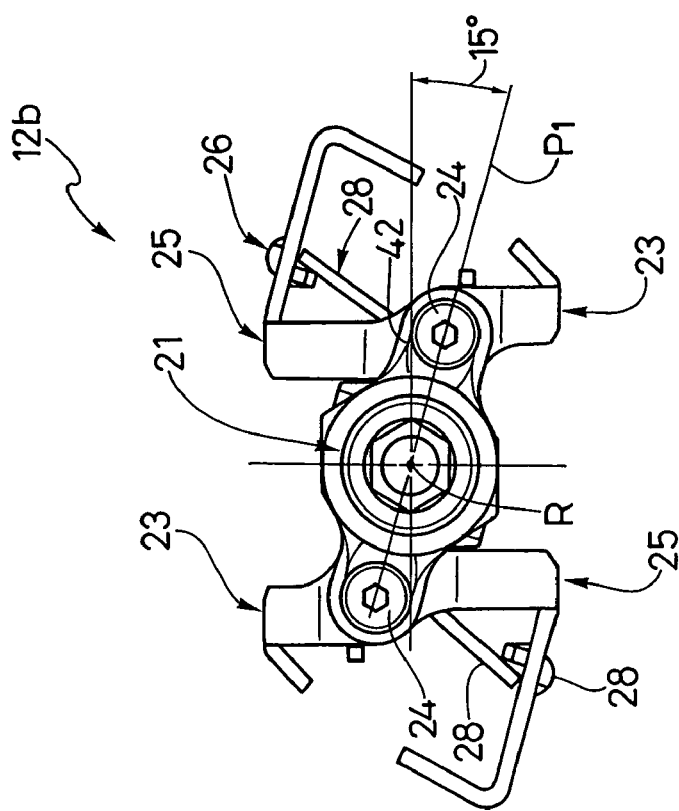
FIG. 7 is an inside side elevational view of the right bicycle pedal illustrated in FIGS. 2–6, without a cleat coupled thereto.

The left and the right bicycle pedals 12a and 12b basically each includes a pedal shaft or spindle 21, a pedal body 22, a pair of front (first) clamping members 23 pivotally coupled to the pedal body 22 by a pair of pivot pins 24, a pair of rear (second) clamping members 25, a pair of spring holders 26 and a pair of biasing members 28. Also, the pedal body 22 preferably includes two pairs of pedal body covers 30 that overlie a center upper portion of the pedal body 22 to protect the pedal body 22 from scratches. The pedals 12a and 12b have an overall length X and an overall height Y as seen in FIG. 8.

As shown in FIG. 1, the pedal spindles 21 are fastened to the crank arms 14a and 14b of the bicycle 10, with the pedal bodies 22 being rotatably coupled to the pedal spindle 21 for supporting the rider's feet. Specifically, the cleats A and B are fixedly attached to the bicycle shoes, which in turn are releasably attached to the pedal bodies 22 via one of the pairs of the front and rear clamping members 23 and 25.

The pedal spindle 21 is a multi-step spindle having numerous stepped portions. The pedal spindle 21 has a first end 31 with threads formed thereon for threadedly coupling bicycle pedal to the crank arm 14a or 14b in a conventional manner. The other end of the pedal spindle 21 rotatably supports the pedal body 22 in a conventional manner. The pedal body 22 can freely rotate about the center rotational axis R of the pedal spindle 21. Since the pedal spindle 21 is relatively conventional and its specific construction is not critical to the present invention, the construction of the pedal spindle 21 will not be discussed in detail herein.

Figure 9:
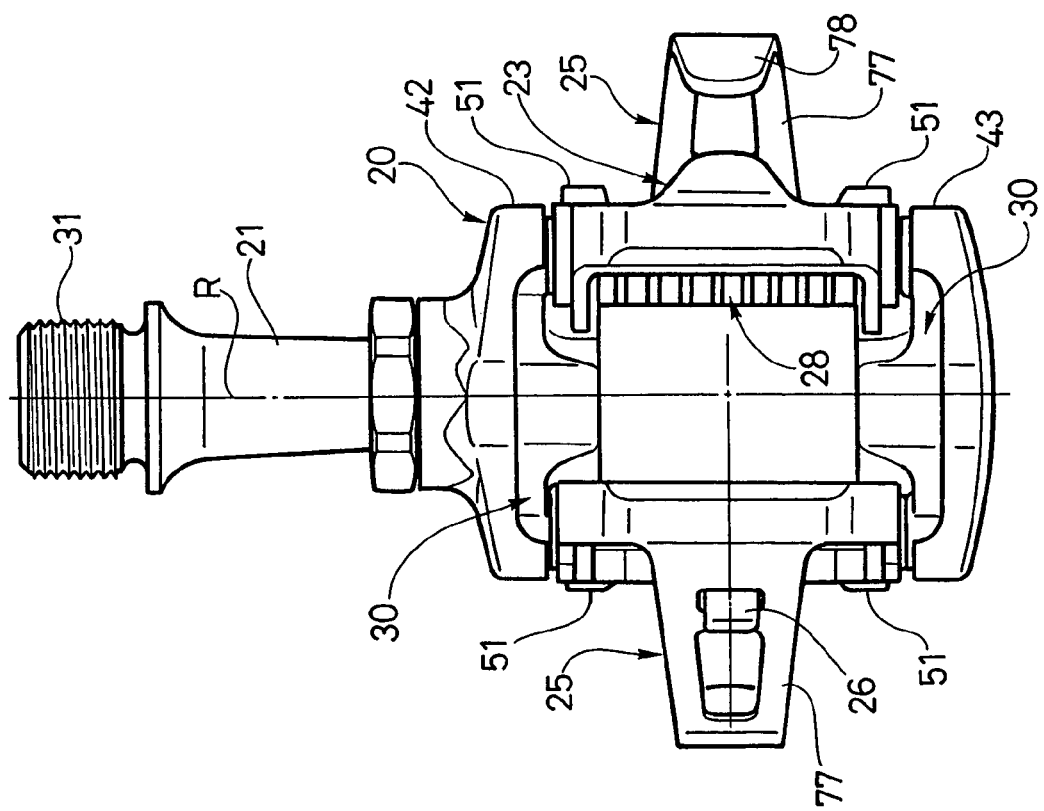
FIG. 9 is a top plan view of the right bicycle pedal illustrated in FIGS. 2–8, without a cleat coupled thereto.
Figure 11:
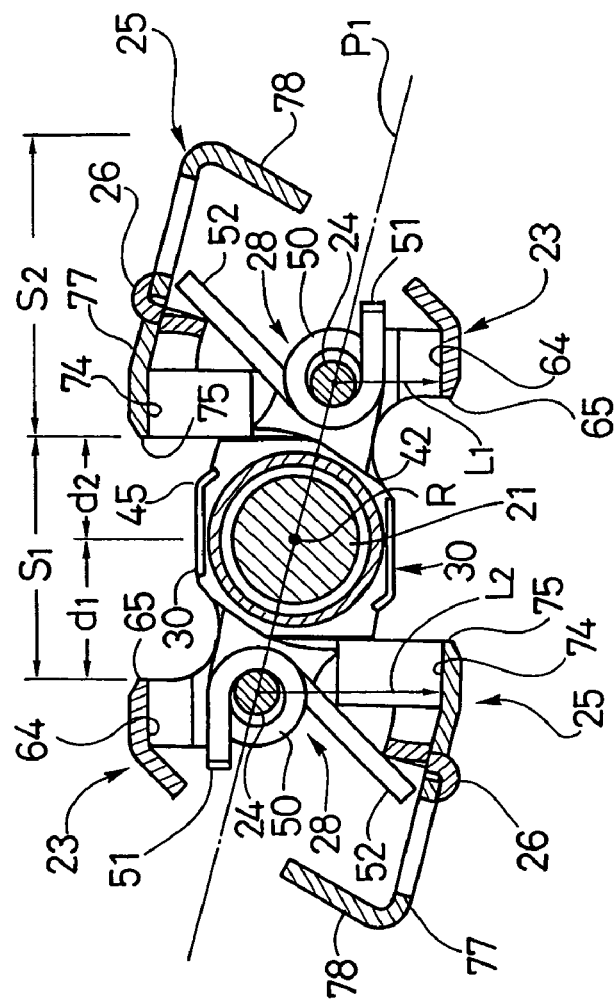
FIG. 11 is a longitudinal cross-sectional view of the bicycle pedal assembly illustrated in FIGS. 5 and 6, as seen along section line 11—11 of FIG. 10, without the cleat coupled thereto.
Figure 10:
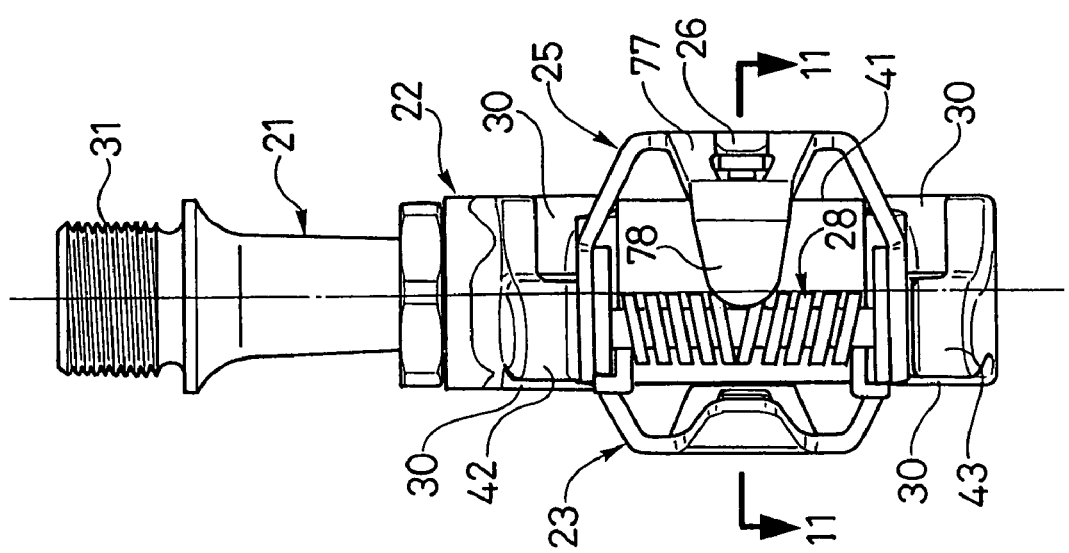
FIG. 10 is a rear end elevational view of the right bicycle pedal illustrated in FIGS. 2–9, without the cleat coupled thereto.
Figure 14:
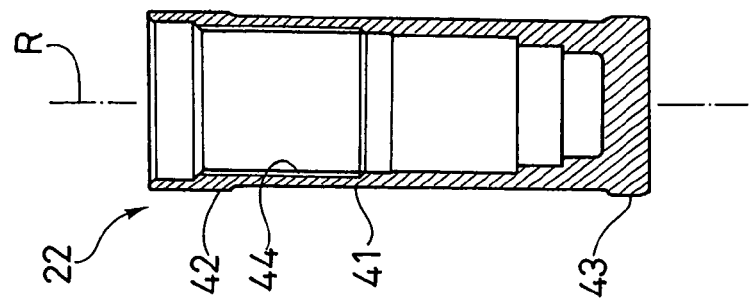
FIG. 14 is a transverse cross-sectional view of the right bicycle pedal body illustrated in FIGS. 12 and 13 for the bicycle pedal illustrated in FIGS. 3–11 as seen along section line 14—14 of FIG. 12.
Figure 13:
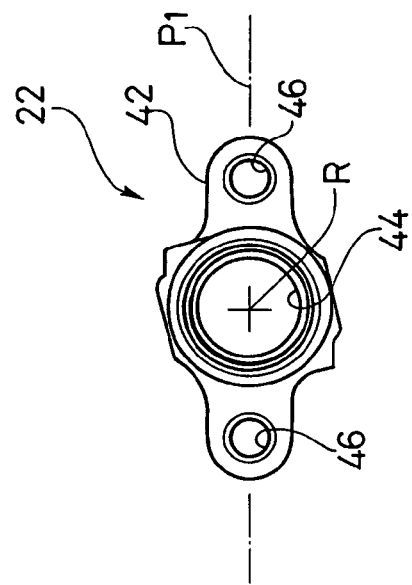
FIG. 13 is an inside elevational view of the right bicycle pedal body illustrated in FIG. 12 for the right bicycle pedal illustrated in FIGS. 3–11.
Figure 12:
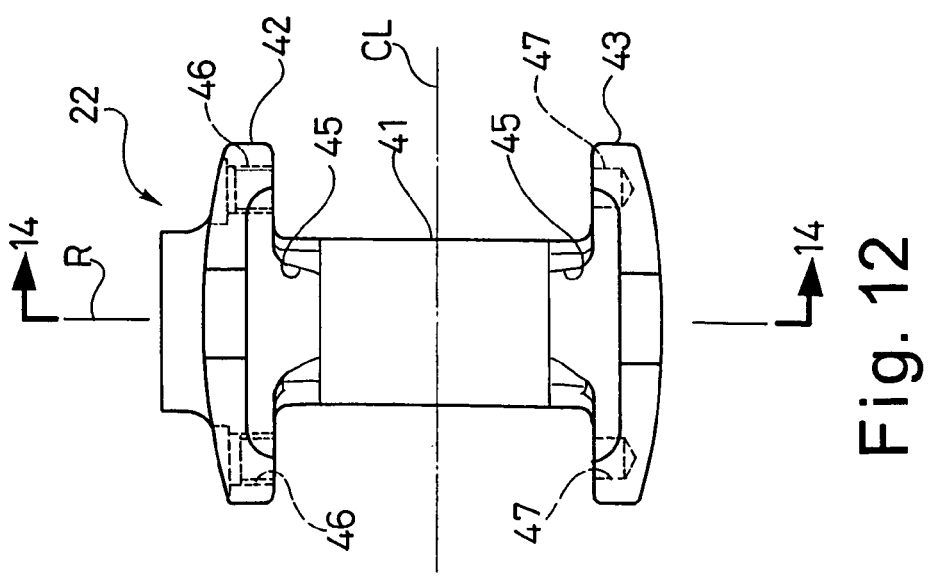
FIG. 12 is a top plan view of the right bicycle pedal body for the right bicycle pedal illustrated in FIGS. 3–11.
Figure 23:
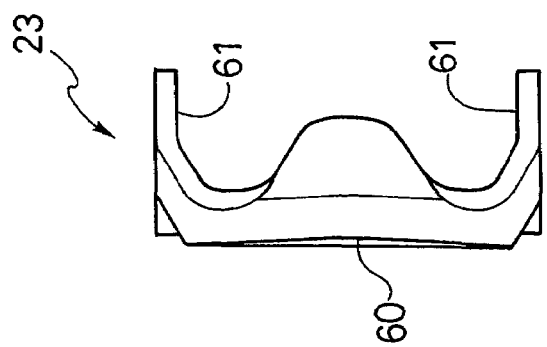
FIG. 23 is an oblique view of the front clamping member illustrated in FIGS. 19–22 for the bicycle pedal assemblies illustrated in FIGS. 2–5.
Figure 20:
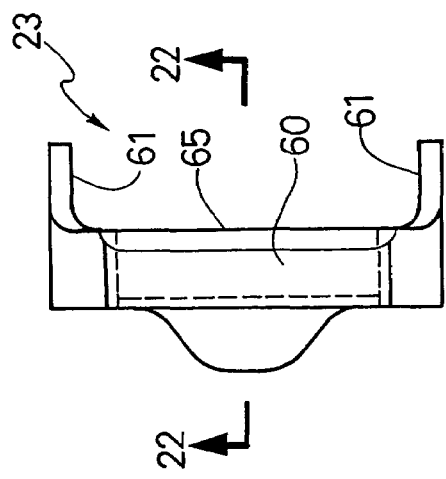
FIG. 20 is a top plan view of the front clamping member illustrated in FIG. 19 for the bicycle pedal assemblies illustrated in FIGS. 2–5.
Figure 22:
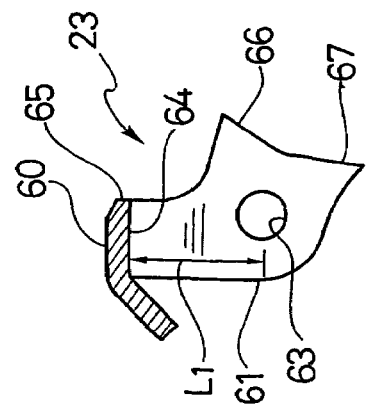
FIG. 22 is a cross-sectional view of the front clamping member illustrated in FIGS. 19–21 for the bicycle pedal assemblies illustrated in FIGS. 2–5, as seen along section line 22—22 of FIG. 20.
Figure 19:
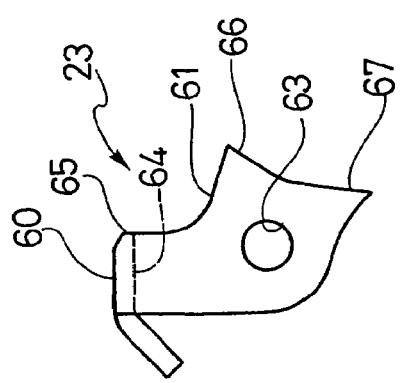
FIG. 19 is a side elevational view of the front clamping member for the bicycle pedal assemblies illustrated in FIGS. 2–5.
Figure 21:
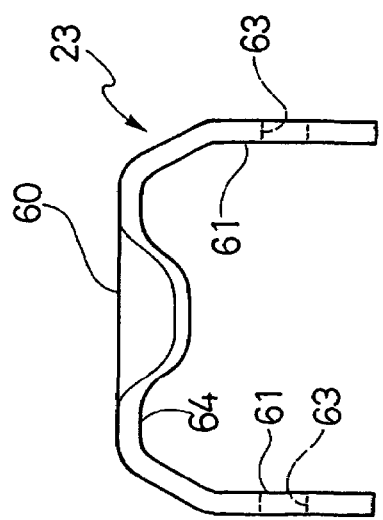
FIG. 21 is a rear end elevational view of the front clamping member illustrated in FIGS. 19 and 20 for the bicycle pedal assemblies illustrated in FIGS. 2–5.
Figure 28:
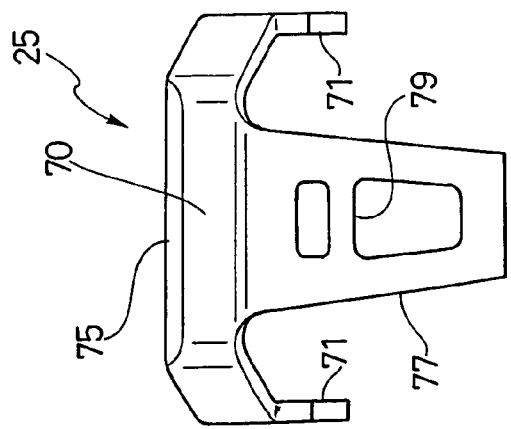
FIG. 28 is an oblique view of the front clamping member illustrated in FIGS. 24–27 for the bicycle pedal assemblies illustrated in FIGS. 2–5.
Figure 25:
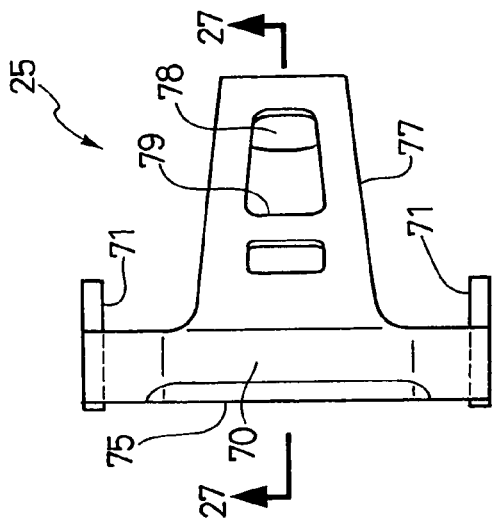
FIG. 25 is a top plan view of the front clamping member illustrated in FIG. 24 for the bicycle pedal assemblies illustrated in FIGS. 2–5.
Figure 27:
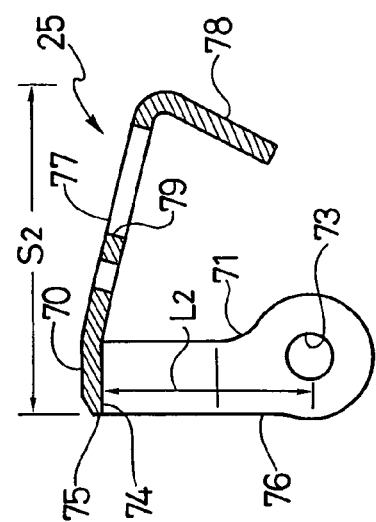
FIG. 27 is a cross-sectional view of the front clamping member illustrated in FIGS. 24–26 for the bicycle pedal assemblies illustrated in FIGS. 3–11, as seen along section line 27—27 of FIG. 25.
Figure 24:
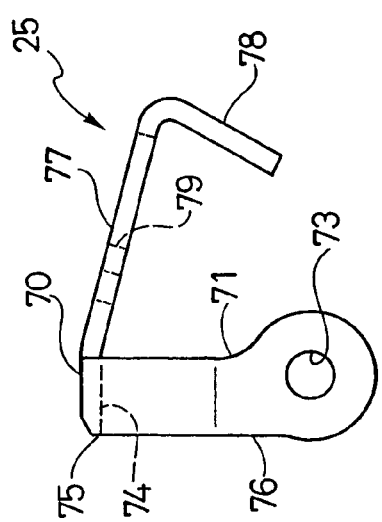
FIG. 24 is a side elevational view of the front clamping member for the bicycle pedal assemblies illustrated in FIGS. 2–5.
Figure 26:
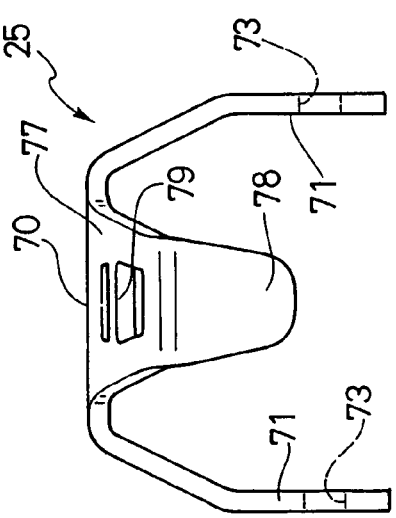
FIG. 26 is a rear end elevational view of the front clamping member illustrated in FIGS. 24 and 25 for the bicycle pedal assemblies illustrated in FIGS. 2–5.

As shown in FIGS. 12–14, the pedal body 22 is an H-shaped member (see FIG. 12) that basically includes a center tubular portion 41, an inner side mounting portion 42 and an outer side mounting portion 43. The pedal body 22 is a rigid member that is preferably made as a one-piece, unitary member from a lightweight material such as an aluminum alloy. As best seen in FIGS. 9–11, the pedal body 22 is rotatably coupled to the pedal spindle 21 for rotation about a center rotational axis R of the pedal spindle 21.

In particular, the center tubular portion 41 has a stepped bore 44 (see FIG. 14) for receiving the pedal spindle 21 for rotation about the center rotational axis R. The side mounting portions 42 and 43 are configured and arranged to pivotal support the clamping members 23 and 25 via the pivot pins 24. The inner side mounting portion 42 extends in a forward and backward direction from an inner end of the center tubular portion 41. The side mounting portions 42 and 43 are provided with a pair of cover receiving recesses 45 on each of the sides of the pedal body 22. The cover receiving recesses 45 are configured and arranged to receive the pedal body covers 30, respectively.

The inner side mounting portion 42 has a pair of threaded holes or bores 46 that threadedly receive the pivot pins 24 therein. The outer side mounting portion 43 extends in a forward and backward direction from an outer end of the center tubular portion 41. The outer side mounting portion 43 has a pair of blind bores 47 that receives the free ends of the pivot pins 24 therein. The unthreaded blind bores 47 are axially aligned with the threaded bores 46 for receiving the outer end of the pivot pins 24. The bores 46 and 47 are configured to secure the pivot pins 24 therein in an aesthetic and reliable manner. Thus, a smooth outer surface of the pedal body 22 can be formed. In other words, the threaded bores 46 aids in providing an attractive appearance, since the heads of the pivot pins 24 are not visible from the outside of the pedal body 22. One of the front clamping members 23 is pivotally mounted at each end of the pedal body 22 by one of the pivot pins 24. Likewise, one of the rear clamping members 25 is pivotally mounted at each end of the pedal body 22 by one of the pivot pins 24.

The pedal body 22 has a center longitudinal line CL extending between the front and the rear ends as seen in FIG. 10. The center longitudinal line CL of the pedal body 22 extends substantially perpendicular to the center rotational axis R of the pedal spindle 21 and bisects the clamping members 23 and 25. The pedal body 22 also has a center plane P1 extending between the first and second ends of the pedal body 22 with the center plane P1 passing through the center rotational axis R of the pedal spindle 21 and the centers of bores 46 and 47 as seen in FIGS. 11 and 13. The center plane P1 divides the pedal body 22 into first and second cleat engagement sides. A cleat receiving area is formed on each side of pedal body 22 for receiving and supporting the cleats A and B thereon. More specifically, the cleat receiving area is defined the area extending longitudinally between the clamping members 23 and 25 on each side of the pedal body 22. Thus, the cleats A and B are designed to releasably couple a sole of a shoe to the bicycle pedals 12a and 12b by a pair of the front and rear clamping members 23 and 25 that located on the same side of the pedal body 22 relative to the center plane P1.

Each biasing member 28 is preferably formed by a pair of torsion springs. The torsion springs of the biasing members 28 have their coiled portions 50 mounted on the pivot pins 24, with one end 51 of each spring engaging a part of one of the front clamping members 23, and the other end 52 of each spring engaging a part of one of the rear clamping members 25. The biasing members 28 normally urge clamping members 23 and 25 to rotate about their respective pivot pins 24 from their cleat releasing positions to their cleat engaging or clamping positions. In other words, the biasing members 28 normally maintain the clamping members 23 and 25 in their cleat engaging positions. The release forces of the biasing members 28 of the clamping members 23 and 25 are controlled by switching which of the cleats A and B are used with which of the pedals 12a and 12b.

Referring back to FIGS. 2–5, the clamping members 23 and 25 selectively engage one of the cleats A and B. The clamping members 23 and 25 are pivotally coupled to the ends of the pedal body 22 by the pivot pins 24. As seen in FIG. 10, the clamping members 23 and 25 are curved in a roughly U-shaped configuration when view along the center longitudinal line CL of the pedal body 22, with their two free ends being swingably supported by the pivot pins 24 that pass between the inner and outer side mounting portions 42 and 43 of the pedal body 22.

Referring now to FIGS. 19–23, each of the front clamping members 23 includes a connecting portion 60 with a pair of legs 61 extending downwardly from connecting portion 60 for coupling the front clamping member 23 to the pedal body 22 via one of the pivot pins 24. More specifically, each of the legs 61 of the front clamping members 23 has a mounting hole 63 formed therein for receiving one of the pivot pins 24. Accordingly, each of the front clamping members 23 is pivotally mounted about its respective pivot pin 24 for movement between a cleat clamping or engaging position and a cleat releasing position.

Each of the connecting portions 60 of the front clamping members 23 has a front cleat engagement portion or surface 64 and a front cleat stop portion or surface 65. The front cleat engagement surface 64 faces generally towards the center plane P1 of the pedal body 22, while the front cleat stop surface 65 is spaced forwardly from the center rotational axis R of the pedal spindle 21 by a first predetermined distance d1 measured parallel to the front cleat engagement surface 64 as seen in FIGS. 8 and 11. The front cleat engagement surface 64 of each front clamping member 23 is configured and arranged to engage a front portion of the cleats A and B to limit movement of the cleats A an B away from the pedal body. The front cleat stop surface 65 of each front clamping member 23 is configured and arranged to engage a front portion of the cleats A and B to limit forward movement of the cleats A and B. The front cleat engagement surface 64 is a flat planar surface. The front cleat stop surface 65 is a flat planar surface that extends substantially perpendicular to the front cleat engagement surface 64.

Figure 6:
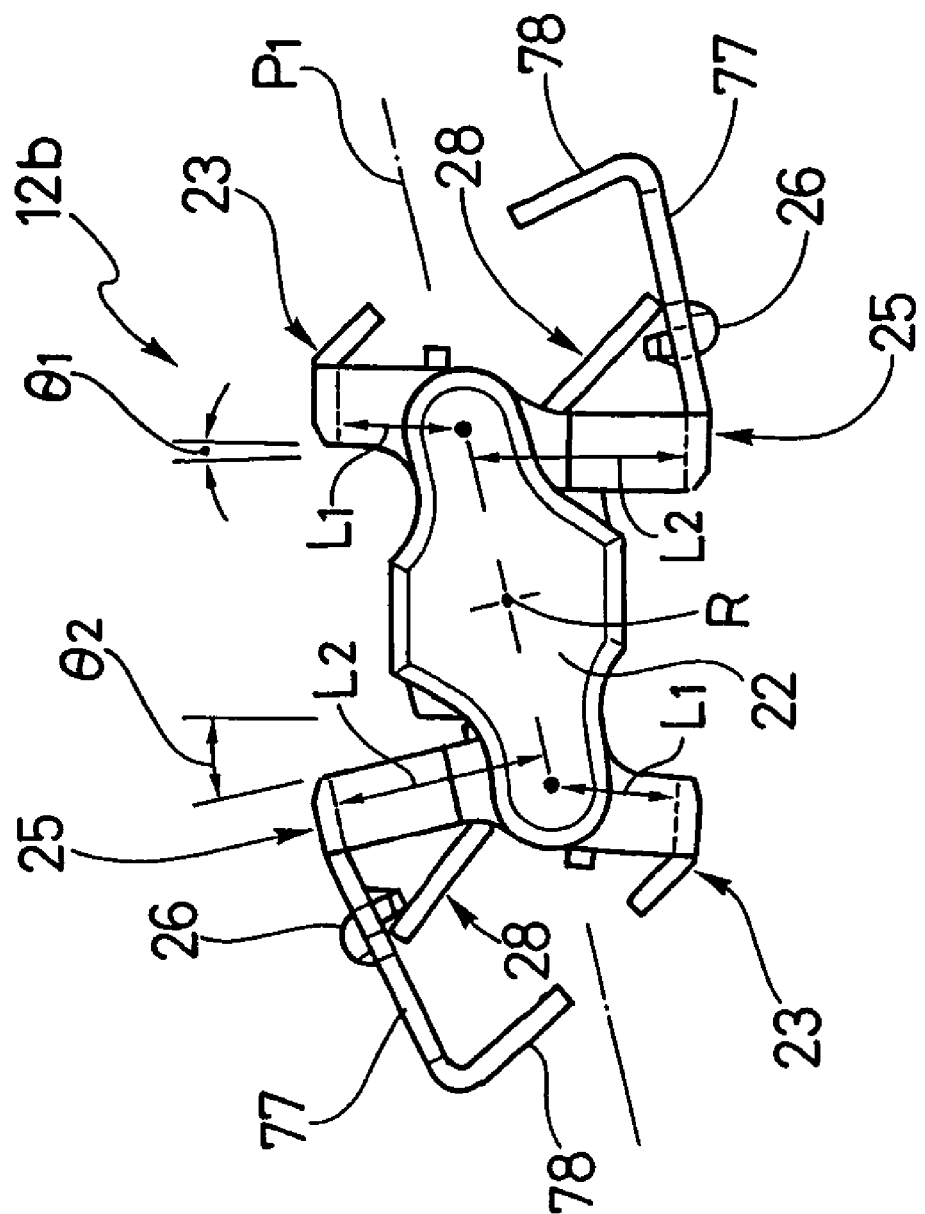
FIG. 6 is a side elevational view of the right bicycle pedal illustrated in FIGS. 2–5, with the rear clamping member of the right bicycle pedal pivoted to a release position that corresponds to with the cleat being rotate relative to the right bicycle pedal by application of the first or second predetermined outward twisting force.

Each of the legs 61 of the front clamping members 23 also has a first stop portion or flange 66 and a second stop portion or flange 67. The first stop portions 66 of each of the front clamping members 23 are configured and arranged to engage the pedal body 22 to limit rotational movement of the front clamping member 23 in a first rotational direction about the respective one of the pivot pins 24. The second stop portions 67 of each of the front clamping members 23 are configured and arranged to engage the pedal body 22 to limit rotational movement of the front clamping member 23 in a second rotational direction about the respective one of the pivot pins 24. More specifically, the first stop portions 66 of each of the front clamping members 23 are normally biased against the pedal body 22 by the respective one of the biasing members 28. The second stop portions 67 of each of the front clamping members 23 are normally spaced from pedal body 22 by a predetermined amount. Thus, as seen in FIG. 6, the front clamping members 23 can pivot about the pivot pins 24 against the urging forces of the biasing members 28 such that the front clamping members 23 can pivot in a generally forward direction by a first predetermined rotational distance or amount θ1. Preferably, the front clamping members 23 can pivot in a generally forward direction by approximately three degrees to about five degrees as measured about the center axis of the respective one of the pivot pins 24.

Referring now to FIGS. 24–28, each of the rear clamping members 25 includes a connecting portion 70 with a pair of legs 71 extending downwardly from connecting portion 70 for coupling the rear clamping member 25 to the pedal body 22 via one of the pivot pins 24. More specifically, each of the legs 71 of the rear clamping members 25 has a mounting hole 73 formed therein for receiving one of the pivot pins 24. Accordingly, each of the rear clamping members 25 is pivotally mounted about its respective pivot pin 24 for movement between a cleat clamping or engaging position and a cleat releasing position.

Each of the connecting portions 70 of the rear clamping members 25 has a rear cleat engagement portion or surface 74 and a rear cleat stop portion or surface 75. The rear cleat engagement surface 74 faces generally towards the center plane P1 of the pedal body 22. The rear cleat stop surface 75 is spaced rearwardly from the center rotational axis R of the pedal spindle 21 by a second predetermined distance d2 measured parallel to the rear cleat engagement surface 74 as seen in FIGS. 8 and 11. The rear cleat engagement surface 74 of each rear clamping member 25 is configured and arranged to engage a rear portion of the cleats A and B to limit movement of the cleats A an B away from the pedal body. The rear cleat stop surface 75 of each rear clamping member 25 is configured and arranged to engage a rear portion of the cleats A and B to limit rearward movement of the cleats A and B. The rear cleat engagement surface 75 is a flat planar surface. The rear cleat stop surface 75 is a flat planar surface that extends substantially perpendicular to the rear cleat engagement surface 74.

Each of the legs 71 of the rear cramping members 25 also has a stop surface 76 that is configured and arranged to engage the pedal body 22 to limit rotational movement of the rear clamping member 25 in a first rotational direction about the respective one of the pivot pins 24, i.e., hold the rear clamping member 25 in rest or cleat engaging position. More specifically, the stop surfaces 76 of each of the rear clamping members 25 are normally biased against the pedal body 22 by the respective one of the biasing members 28. Thus, the rear clamping members 25 can pivot about the pivot pins 24 against the urging forces of the biasing members 28 such that the rear clamping members 25 can pivot in a generally rearward direction by a predetermined rotational distance or amount θ2, as seen in FIG. 6. Preferably, the predetermined rotational distance θ2 is about thirteen degrees, when the pedal and cleat are arranged to require the first predetermined outward twisting force F1 and about fourteen degrees, when the pedal and cleat are arranged to require the second predetermined outward twisting force F2. Preferably, the rear clamping members 25 can pivot in a generally rearward direction by at least fourteen degrees as measured about the center axis of the respective one of the pivot pins 24.

As seen in FIG. 11, first and second cleat engagement surfaces 64 and 74 preferably lie in substantially the same plane, which forms an acute angle with the center plane P1. Thus, the first and second cleat engagement surfaces 64 and 74 hold the cleat A or B from moving vertically from the pedal body 22. Preferably, the first cleat engagement surface 64 is spaced from the pivot axis of the pivot pin 24 by a predetermined distance L1, while the second cleat engagement surface 74 is spaced from the pivot axis of the pivot pin 24 by a predetermined distance L2 that is larger than the predetermined distance L1. The first and second cleat stop surfaces 65 and 75 hold the cleat A or B from moving in a front to rearward direction of the pedal body 22. Preferably, the first and second cleat stop surfaces 65 and 75 are spaced apart by a predetermined distance S1. Moreover, the second cleat stop surface 75 is spaced (offset) from the center rotational axis R of the pedal spindle 21 by the predetermined distance d2, while the first cleat stop surface 65 is spaced (offset) from the center rotational axis R of the pedal spindle 21 by the predetermined distance d1 that is larger than the predetermined distance d2. The dimensions d1 and d2 are measured along a plane that extends perpendicular to the first and second cleat stop surfaces 65 and 75. Since dimension d1 is greater than the dimension d2, the step-in torque is approximately 17% greater than if the dimensions d1 and d2 were equal.

Figure 40:
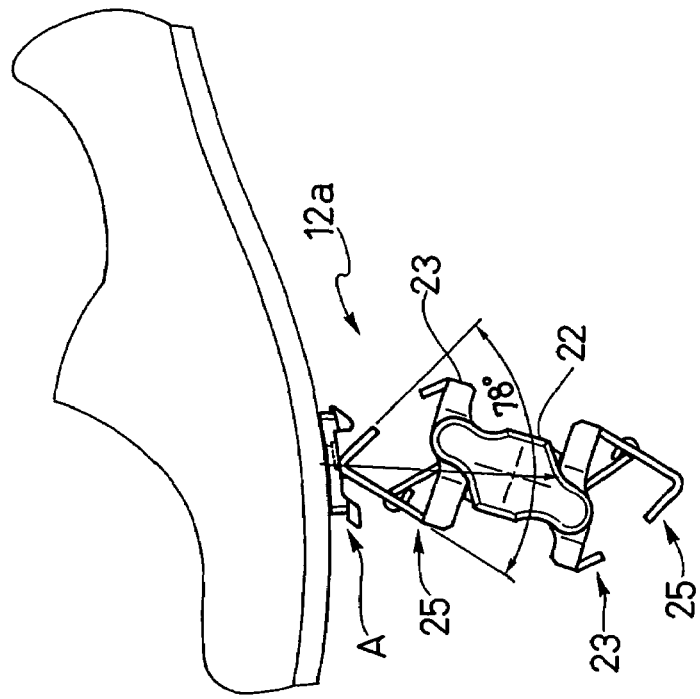
FIG. 40 is a side elevational view of a left bicycle shoe with one of the cleats of the present invention coupled thereto, prior to coupling of the cleat to the left bicycle pedal.
Figure 39:
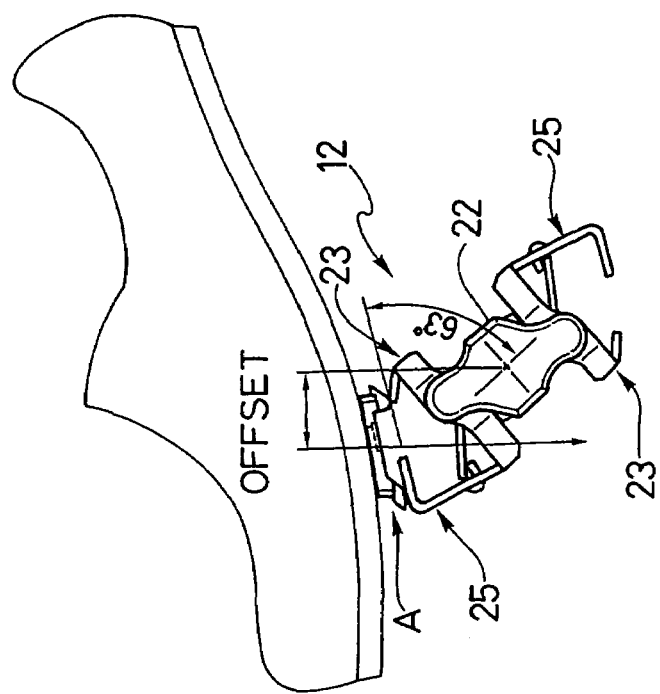
FIG. 39 is a side elevational view of a left bicycle shoe with one of the cleats of the present invention coupled thereto, prior to coupling of the cleat to the left bicycle pedal.

As seen in FIGS. 24–28, the rear clamping members 25 are provided with a generally horizontal portion 77 and a generally vertical portion 78. The portions 77 and 78 form an elongated tongue having an L-shape as viewed from the side. This elongated tongue assists the rider in rotating the real body 22 to horizontal position for engagement as seen in FIGS. 39 and 40. As seen in FIG. 11, the generally horizontal portion 77 extends in a substantially rearward direction past the end of the pedal body 22 by a predetermined distance S2 that is at least substantially equal to or greater than the predetermined distance S1. The generally horizontal portion 77 of the rear clamping members 25 is provided with an opening 79 for receiving the spring holder 26 to couple the second ends 52 of the torsion springs that form the biasing member 28 to the rear clamping member 25.

Referring now to FIGS. 17 and 18, each of the pedal body covers 30 basically includes a protective body portion 90, a first attachment leg 91 and a second attachment leg 92. The first and second attachment legs 91 and 92 have attachment holes 93 and 94, respectively, for receiving the pivot pins 24 therethrough. Thus, the pedal body covers 30 are fixedly coupled to the pedal body 22 by the pivot pins 24. Each of the pedal body covers 30 is a rigid member that is preferably made as a one-piece, unitary member from a material that is harder than the material of the pedal body 22 such as stainless steel. There are four of the pedal body covers 30 with two of the pedal body covers 30 mounted on each side of the pedal body 22 in the cover receiving recesses 45. In particular, the pedal body covers 30 are located at the ends of the center tubular portion 41 in the area where the cleat A or B will rub against the pedal body 22 if the pedal body covers 30 were removed.

Referring now to FIGS. 29–38, the cleats A and B are basically mirror images of each other. It will be apparent to those skilled in the art from this disclosure that the descriptions of the portions of the cleat A (FIGS. 29–33) also to applies to the corresponding portions of the cleat B (FIGS. 34–38) and vice a versa. Thus, the same reference numerals will be used to describe both the portions of the cleat A and the corresponding portions of the cleat B for the sake of brevity.

Basically, each of the cleats A and B includes an attachment portion 100, a first or front coupling portion or member 101 extending from one end of the attachment portion 100 and a second or rear coupling portion or member 102 extending from the other end of the attachment portion 100. The front coupling portion or member 101 has a pair of lateral-front corner abutments $C_{F1}$ and $C_{F2}$, while the rear coupling portion or member 102 has a pair of lateral rear corner abutments $C_{R1}$ and $C_{R2}$. The front corner abutments $C_{F1}$ and $C_{F2}$ selectively contact the front clamping member 23 when the cleat is pivoted about its pivot axis P of the cleat A or B, while the rear corner abutments $C_{R1}$ and $C_{R2}$ selectively contact the rear clamping member 25 when the cleat is pivoted about its pivot axis P of the cleat A or B. The pivot axis P is located at the intersection of a first line that extends between the front and rear corner abutments $C_{F1}$ and $C_{R1}$ and a second line that extends between the front and rear corner abutments $C_{F2}$ and $C_{R2}$ as seen in FIGS. 33 and 38. The pivot axis P also lies on a center line CL of the cleat A or B. As seen in FIGS. 32 and 37 the front and rear corner abutments $C_{F1}$ and $C_{R1}$ are spaced laterally from the center line CL of the cleat A or B by a first lateral distance $DL_1$, while the front and rear corner abutments $C_{F2}$ and $C_{R2}$ are spaced laterally from the center line CL of the cleat A or B by a second lateral distance $DL_2$ that is larger than the first lateral distance $DL_1$. This arrangement at least partially results in the low outward twisting force F1 and the high outward twisting force F2 for release the cleat A or B depending on which of the cleats A and B are used with which of the pedals 12a and 12b.

The attachment portion 100 has an upper sole side 103 facing in a first direction for engaging the sole of the shoe and a lower pedal side facing 104 in a second direction which is substantially opposite to the first direction. Preferably the attachment portion 100 and the coupling portions 101 and 102 are integrally formed together as a one-piece, unitary member, which is constructed from a suitable rigid material.

The attachment portion 100 has a pair of hole or slot 105 for receiving one or more fasteners for fixedly coupling to the sole of the cyclist's shoe in a relatively conventional manner. The interconnection of the cleat A to the sole is relatively well known in the art, and thus, this interconnection will not be discussed or illustrated in detail herein.

The front coupling portion 101 is designed to engage the front clamping member 23. The front coupling portion 101 has a nose portion or flange 106 with a first or front coupling surface 106a, a center front stop surface 107 and a pair of lateral front stop surfaces 108. The front coupling surface 106a faces towards the sole of the shoe, while the front stop surfaces 107 and 108 extend substantially perpendicular to the front coupling surface 106a. The center front stop surface 107 is designed to engage the front stop surface 65 of the front clamping member 23 to prevent forward movement of the cleats relative to the pedal body 22.

The center front stop surfaces 107 is arranged to extend perpendicular to a center line CL of the cleat A or B that divides the front coupling surface 106a into two equal side portions. The lateral front stop surfaces 108 are angled relative to the center front stop surfaces 107 so that they are inclined rearwardly as they extend outwardly from the center front stop surfaces 107. Preferably, the lateral front stop surfaces 108 are angled about five degrees relative to the center front stop surfaces 107. The lateral front stop surfaces 108 are designed to engage the front stop surface 65 of the front clamping member 23 when the cleat is pivoted about its pivot axis P of the cleat A or B. The lateral front stop surfaces 108 form the front lateral corner abutments $C_{F1}$ and $C_{F2}$ that are spaced from the center line CL of the cleat A or B. The front lateral corner abutment $C_{F1}$ is spaced a shorter distance from the center line CL of the cleat A or B than the front lateral corner abutment $C_{F2}$ from the center line CL of the cleat A or B. Thus, the rear lateral corner abutment $C_{R1}$ forms a low force rear corner abutment, while the rear lateral corner abutment $C_{R2}$ forms a high force rear corner abutment.

The second or rear coupling portion 102 extends from the second end of the attachment portion 100. The rear coupling portion 102 is designed to engage the rear clamping member 25. The rear coupling portion 102 has a nose portion or rear flange 109 and a center rear stop surface 110 and a pair of lateral rear stop surfaces 111. The nose portion or rear flange 109 includes a second or rear coupling surface 109a and a rear edge 109b extending perpendicularly relative to the rear coupling surface 109a. The rear edge 109b includes corners $C_{RR1}$ and $C_{RR2}$ that define the release points of the rear flange 109. In other words, when the cleat A or B is pivoted about its pivot axis P of the cleat A or B, the rear flange 109 will be twisted outwardly from underneath the rear clamping member 25. The cleat A or B will release from the rear clamping member 25 when one of the corners $C_{RR1}$ and $C_{RR2}$ of the rear flange 109 aligns with the rear stop surface 75 of the rear clamping member 25. In other words, when one of the corners $C_{RR1}$ and $C_{RR2}$ of the rear flange 109 can be seen from above, the rear flange of the cleat A or B releases from the rear stop surface 75 of the rear clamping member 25. The corner $C_{RR1}$ is located on the same side of the center line CL as the rear lateral corner abutment $C_{R1}$, while the corner $C_{RR2}$ is located on the same side of the center line CL as the rear lateral corner abutment $C_{R2}$. The rear flange 109 is shifted from the center line CL towards the rear lateral corner abutment $C_{R2}$ by an OFFSET distance to control the release angle. Thus, the corners $C_{RR1}$ and $C_{RR2}$ of the rear flange 109 are symmetrically arranged about the OFFSET axis that is parallel to the center line CL. Preferably, in the preferred embodiment, the OFFSET distance is about 0.65 mm from the center line CL of the cleat A or B towards the rear lateral corner abutment $C_{R2}$. Preferably, this OFFSET distance is dimensioned together with the corners $C_{RR1}$ and $C_{RR2}$ of the rear flange 109 and the rear lateral corner abutments $C_{R1}$ and $C_{R2}$ such that the release angle (e.g., 15°) is substantially identical for each of the cleats A and B whether used with the left pedal 12a or the right pedal 12b.

The rear coupling surface 109a faces towards the sole of the shoe, while the rear stop surfaces 110 and 111 extend substantially perpendicular to the rear coupling surface 110. The rear stop surfaces 110 and 111 are designed to engage the stop surface 75 of the rear clamping member 25 to prevent rearward movement of the cleat A or B relative to the pedal body 22. Preferably, the coupling surfaces 106a and 109a are formed so as to lie in substantially the same plane.

The lateral rear stop surfaces 111 are angled relative to the center rear stop surface 110 so that they are inclined forwardly as they extend outwardly from the center rear stop surface 110. Preferably, the lateral rear stop surfaces 111 are angled about five degrees relative to the center rear stop surface 110. The lateral rear stop surfaces 111 are designed to engage the rear stop surface 75 of the rear clamping member 25 when the cleat A or B is pivoted about its pivot axis P of the cleat A or B.

The rear stop surfaces 110 and 111 are symmetrically arranged about an OFFSET that is spaced by 0.65 mm to one side of the cleat A or B from the center line CL of the cleat A or B. The lateral rear stop surfaces 111 form the rear lateral corner abutments $C_{R1}$ and $C_{R2}$ that are spaced from the center line CL of the cleat A or B. The rear lateral corner abutments $C_{R1}$ and $C_{R2}$ form effective lever arms 112 and 113, respectively, i.e., the length from pivot axis P of the cleat A or B to the lateral corner abutments $C_{R1}$ and $C_{R2}$. The lever arm 112 is shorter than the lever arm 113. The lateral corner abutment $C_{R1}$ is spaced a shorter distance from the center line CL of the cleat A or B than the lateral corner abutment $C_{R2}$ from the center line CL of the cleat A or B. Thus, when the lateral corner abutment $C_{R1}$ engages the rear stop surface 75 of the rear clamping member 25 upon the application of an outward twisting force, the cleat A or B easier to pivot to the release position than the lateral corner abutment $C_{R2}$ engages the rear stop surface 75 of the rear clamping member 25.

One preferred assembly operation of the bicycle pedals 12a and 12b will now be discussed. The bicycle pedals 12a and 12b are assembled by initially installing the front and rear clamping members 23 and 25 to the bicycle pedal body 22 by the pivot pins 24. This is done by positioning the front and rear clamping members 23 and 25 between the side mounting portions 42 and 43. Next, the four pedal body covers 30 are mounted in the cover receiving recesses 45. Thus, first and second attachment legs 91 and 92 of the four pedal body covers 30 have their attachment holes 93 and 94 arranged for receiving the pivot pins 24 therethrough. Now, the biasing members 28 are held in place between the front and rear clamping members 23 and 25. The pivot pins 24 are now installed in the pedal body 22 such that the front and rear clamping members 23 and 25, the biasing members 28 and the pedal body covers 30 are mounted on the pivot pins 24. Thus, the pedal body covers 30 are fixedly coupled to the pedal body 22 by the pivot pins 24, while the front and rear clamping members 23 and 25 are pivotally coupled to the pedal body 22 by the pivot pins 24. In this state the biasing members 28 are not in their fully preloaded state. Thus, the springs of the biasing members 28 are now wound about the pivot pins 24 and the spring holders 26 are insert into openings of the rear clamping members 25 to properly preload the biasing members 28, which urge the front and rear clamping members 23 and 25 to their rest positions. This arrangement allows the biasing members 28 to be initially installed in an unloaded state for easy assembly. In other words, the front and rear clamping members 23 and 25 and the biasing members 28 can be installed on the bicycle pedal body 22 without having to preloaded the biasing members 28 under high tension.

Operation of the bicycle pedal 12b will now be briefly described with reference mainly to FIGS. 39–40. Due to the unique construction of the bicycle pedals 12a and 12b, the rider can easily rotate the pedal 12a or 12b from a non-horizontal position as seen in FIGS. 39 and 40 to a substantially horizontal position as seen FIGS. 41 and 42. When a bicycle shoe is to be attached to one of the bicycle pedal 12a, the rider can rotate the pedal 12a from the non-horizontal position shown in FIG. 39 to a substantially horizontal position as seen FIGS. 41 and 42, by rotating the bicycle pedal 12a in a counter clockwise direction. Because the front and rear clamping members 23 and 25 are configured and arranged to create long horizontal sides and short vertical ends and because the rear clamping members 25 are offset from the axis R, the rider can easily rotate the pedal 12a. Moreover, when the pedal 12a is in the non-horizontal position shown in FIG. 40, the rider can easily rotate the pedal 12a in either direction.

Figure 41:
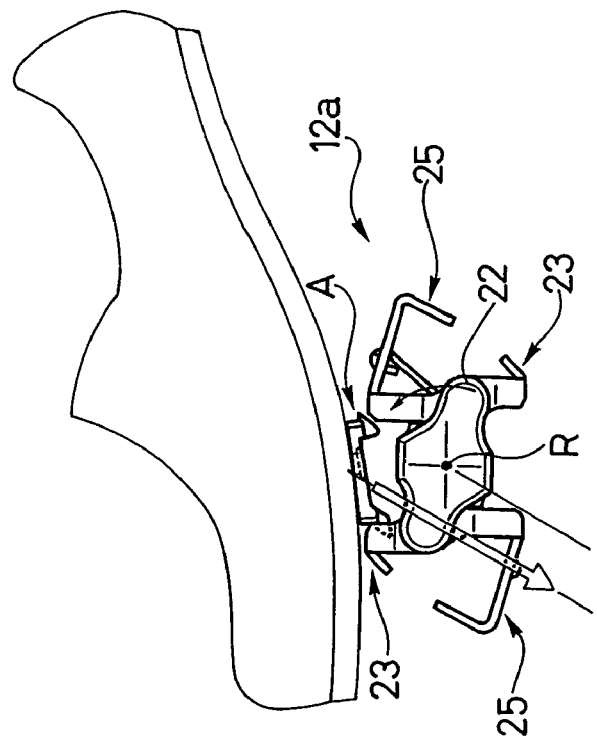
FIG. 41 is a side elevational view of a left bicycle shoe with one of the cleats of the present invention coupled thereto, prior to coupling of the cleat to the left bicycle pedal.
Figure 42:
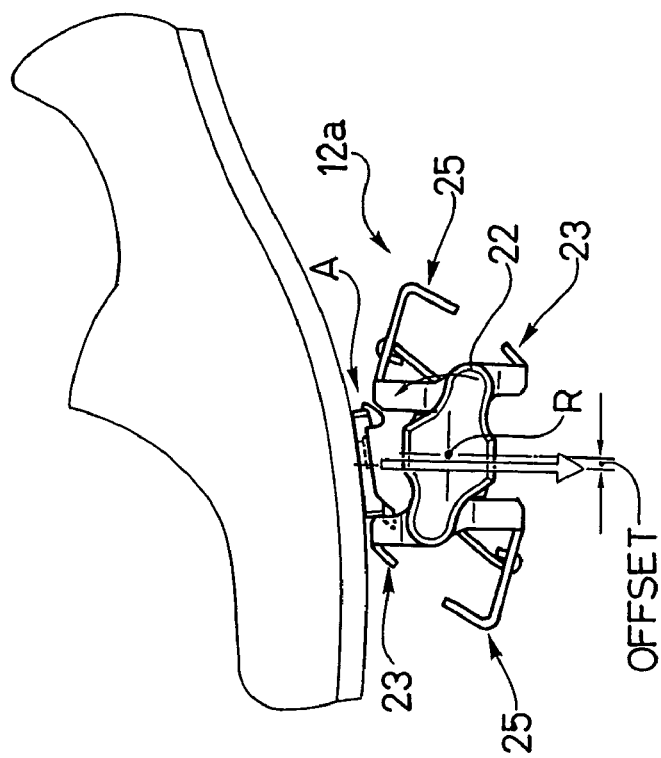
FIG. 42 is a side elevational view of a left bicycle shoe with one of the cleats of the present invention coupled thereto, prior to coupling of the cleat to Che left bicycle pedal.

Once the pedal 12a is in a substantially horizontal position as seen FIGS. 41 and 42, the rider moves the tip of the shoe forward towards one of the front clamping members 23 so that the tip of the cleat A or B is inserted underneath one of the front clamping members 23. Once the tip of the cleats A and B has been inserted underneath one of the front clamping members 23, a downwardly directed force is applied by the shoe, such that the shoe is pushed down toward the bicycle pedal body 22. When the shoe is pressed down further from this state shown in FIGS. 41 and 42 the rear end of the cleat A or B rotates one of the rear clamping members 25 backward against the biasing force of one of the biasing members 28. Simultaneously, the front end of the cleat A or B rotates the front clamping member 25 forward against the biasing force of the other one of the biasing members 28. The cleat A or B then slides between the front and rear clamping member 23 and 25. Once the cleat A or B has slid between the front and rear clamping member 23 and 25, the front and rear clamping member 23 and 25 are biased by the biasing members 28 back to their original positions. As a result, the cleat A or B is engaged between the front and rear clamping member 23 and 25 (see FIG. 2).

When the shoe is to be removed from the bicycle pedal 12a or 12b, the heel portion of the shoe is lightly twisted to the outside about the pivot axis P. This twisting motion will cause the front and rear clamping member 23 and 25 to rotate against the energizing forces of the biasing members 28, and the engagement of the rear end of the cleat A or B will be released instantly. Depending on which of the cleats A and B are used with which pedal will determine the release force F1 or F2 that is necessary to rotate the cleats A and B to their release positions.

As used herein, the following directional terms "forward, rearward, above, downward, vertical, horizontal, below and transverse" as well as any other similar directional terms refer to those directions of a bicycle equipped with a pedal of the present invention and when the pedal is horizontally oriented relative to the ground. Accordingly, these terms, as utilized to describe the present invention should be interpreted relative to a bicycle equipped with a pedal of the present invention.

The terms of degree such as "substantially", "about" and "approximately" as used herein mean a reasonable amount of deviation of the modified term such that the end result is not significantly changed. These terms should be construed as including a deviation of at least ±5–10% of tne modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle pedal assembly comprising:
    a bicycle pedal including
        a pedal shaft having a center rotational axis;
        a pedal body rotatably coupled to the pedal shaft about the center rotational axis of the pedal shaft, the pedal body having a first end and a second end with a center plane extending between the first and second ends and passing through the center rotational axis of the pedal shaft;
        a front clamping member coupled to the first end of the pedal body, the front clamping member having a front cleat engagement surface facing towards the center plane of the pedal body; and
        a rear clamping member coupled to the second end of the pedal body, the rear clamping member having a rear cleat engagement surface facing towards the center plane of the pedal body; and
    first and second bicycle shoe cleats configured and arranged to be interchangeably coupled to the front and rear clamping members of the bicycle pedal;
    the first bicycle shoe cleat including first front and rear attachment portions configured and arranged to cooperate with the front and rear clamping members to release the first bicycle shoe cleat from a cleat engaged position to a cleat released position upon application of a first predetermined amount of outward twisting force,
    the second bicycle shoe cleat including second front and rear attachment portions configured and arranged to cooperate with the front and rear clamping members to release the second bicycle shoe cleat from the cleat engaged position to the cleat released position upon application of a second predetermined amount of outward twisting force that is higher than the first predetermined amount of outward twisting force, the first and second bicycle shoe cleats being further configured and arranged to release from the bicycle pedal at substantially an identical cleat release angle.

2. The bicycle pedal assembly according to claim 1, wherein
the rear clamping member is movably coupled to the pedal body to move between the cleat engaged position to the cleat released position.

3. The bicycle pedal assembly according to claim 1, wherein
the first and second bicycle shoe cleats are configured and arranged to deflect the rear clamping member about an equal amount.

4. The bicycle pedal assembly according to claim 1, wherein
the first and second bicycle shoe cleats are configured and arranged such that the second bicycle shoe cleat deflects the rear clamping member slightly more than the first bicycle shoe cleat.

5. The bicycle pedal assembly according to claim 4, wherein
the rear clamping member is pivotally coupled to the pedal body about a rear pivot axis with a biasing member urging the rear clamping member towards the cleat engaged position.

6. The bicycle pedal assembly according to claim 1, wherein
the first front attachment portion includes a first front coupling surface selectively engageable with the front engagement surface of the front clamping member, the first rear attachment portion includes a first rear coupling surface selectively engageable with the rear engagement surface of the rear clamping member; and
the second front attachment portion includes a second front coupling surface selectively engageable with the front engagement surface of the front clamping member, the second rear attachment portion includes a second rear coupling surface selectively engageable with the rear engagement surface of the rear clamping member.

7. The bicycle pedal assembly according to claim 6, wherein
the first front and rear attachment portions of the first bicycle shoe cleat are substantially mirror images of the second front and rear attachment portions of the second bicycle shoe cleat.

8. The bicycle pedal assembly according to claim 6, wherein
the rear clamping member is movably coupled to the pedal body to move between the cleat engaged position to the cleat released position.

9. The bicycle pedal assembly according to claim 8, wherein
the first rear attachment portion further includes a high release force engagement surface arranged and configured on a first side of a front to rear center longitudinal axis of the first bicycle shoe cleat to selectively engage an inside section of the rear clamping member and move the rear clamping member upon application of the first predetermined amount of outward twisting force on the first bicycle shoe cleat relative to the pedal body, and
the second rear attachment portion further includes a low release force engagement surface arranged and configured on a first side of a front to rear center longitudinal axis of the second bicycle shoe cleat to selectively engage the inside section of the rear clamping member and move the rear clamping member upon application of the second predetermined amount of outward twisting force on the second bicycle shoe cleat relative to the pedal body.

10. A bicycle pedal assembly comprising:
right and left bicycle pedals, each of the right and left bicycle pedals including
a pedal shaft having a center rotational axis;
a pedal body rotatably coupled to the pedal shaft about the center rotational axis of the pedal shaft, the pedal body having a first end and a second end with a center plane extending between the first and second ends and passing through the center rotational axis of the pedal shaft;
a front clamping member coupled to the first end of the pedal body, the front clamping member having a front cleat engagement surface facing towards the center plane of the pedal body; and
a rear clamping member coupled to the second end of the pedal body, the rear clamping member having a rear cleat engagement surface facing towards the center plane of the pedal body;
a first bicycle shoe cleat including first front and rear attachment portions configured and arranged to selectively cooperate with the front and rear clamping members of the right and left bicycle pedals; and
a second bicycle shoe cleat including second front and rear attachment portions configured and arranged to selectively cooperate with the front and rear clamping members of the right and left bicycle pedals,
the first bicycle shoe cleat being further configured and arranged to release from the left bicycle pedal upon application of a first predetermined amount of outward twisting force on the first bicycle shoe cleat,
the second bicycle shoe cleat being further configured and arranged to release from the right bicycle pedal upon application of the first predetermined amount of outward twisting force on the second bicycle shoe cleat,
the first bicycle shoe cleat being further configured and arranged to release from the right bicycle pedal upon application of a second predetermined amount of outward twisting force that is higher than the first predetermined amount of outward twisting force on the first bicycle shoe cleat,
the second bicycle shoe cleat being further configured and arranged to release from the left bicycle pedal upon application of the second predetermined amount of outward twisting force on the second bicycle shoe cleat.

11. The bicycle pedal assembly according to claim 10, wherein
the first and second bicycle shoe cleats are configured and arranged to release from the right and left bicycle pedals at substantially an identical cleat release angle.

12. The bicycle pedal assembly according to claim 10, wherein
the rear clamping member of the right bicycle pedal is movably coupled to the pedal body of the right bicycle pedal to move between a cleat engaged position to a cleat released position, and the rear clamping member of the left bicycle pedal is movably coupled to the pedal body of the left bicycle pedal to move between a cleat engaged position to a cleat released position.

13. The bicycle pedal assembly according to claim 10, wherein the first and second bicycle shoe cleats and the rear clamping members of the left and right bicycle pedals are configured and arranged to deflect the rear clamping members of the right and left bicycle pedals about an equal amount regardless of which of the first and second bicycle shoe cleats are used with the left and right bicycle pedals.

14. The bicycle pedal assembly according to claim 10, wherein the first bicycle shoe cleat and the rear clamping member of the left bicycle pedal are further configured and arranged such that the rear clamping member of the left bicycle pedal deflects by a first deflection amount to release the first bicycle shoe cleat from the left bicycle pedal upon application of the first predetermined amount of outward twisting force on the first bicycle shoe cleat, the second bicycle shoe cleat and the rear clamping member of the right bicycle pedal are further configured and arranged such that the rear clamping member of the right bicycle pedal deflects by a first deflection amount to release the first bicycle shoe cleat from the right bicycle pedal upon application of the first predetermined amount of outward twisting force on the first bicycle shoe cleat, the first bicycle shoe cleat and the rear clamping member of the right bicycle pedal are further configured and arranged such that the rear clamping member of the right bicycle pedal deflects by a second deflection amount that is slightly more than the first deflection amount to release the first bicycle shoe cleat from the right bicycle pedal upon application of the second predetermined amount of outward twisting force on the first bicycle shoe cleat, and the second bicycle shoe cleat and the rear clamping member of the left bicycle pedal are further configured and arranged such that the rear clamping member of the left bicycle pedal deflects by the second deflection amount to release the second bicycle shoe cleat from the left bicycle pedal upon application of the second predetermined amount of outward twisting force on the second bicycle shoe cleat.

15. The bicycle pedal assembly according to claim 14, wherein the rear clamping member of the right bicycle pedal is pivotally coupled to the pedal body of the right bicycle pedal about a rear pivot axis with a biasing member urging the rear clamping member of the right bicycle pedal towards a cleat engaged position, and the rear clamping member of the left bicycle pedal is pivotally coupled to the pedal body of the left bicycle pedal about a rear pivot axis with a biasing member urging the rear clamping member of the left bicycle pedal towards a cleat engaged position.

16. The bicycle pedal assembly according to claim 10, wherein the first front and rear attachment portions of the first bicycle shoe cleat are substantially mirror images of the second front and rear attachment portions of the second bicycle shoe cleat.

17. The bicycle pedal assembly according to claim 10, wherein the first rear attachment portion of the first bicycle shoe cleat further includes a first low release force engagement surface arranged on a first side of a front to rear center longitudinal axis of the first bicycle shoe cleat, and a first high release force engagement surface arranged on a second side of a front to rear center longitudinal axis of the first bicycle shoe cleat, the first low release force engagement surface being configured to selectively engage an inside section of the rear clamping member of the left bicycle pedal and move the rear clamping member of the left bicycle pedal upon application of the first predetermined amount of outward twisting force on the first bicycle shoe cleat relative to the left bicycle pedal, the first high release force engagement surface being configured to selectively engage an inside section of the rear clamping member of the right bicycle pedal and move the rear clamping member of the right bicycle pedal upon application of the second predetermined amount of outward twisting force on the first bicycle shoe cleat relative to the right bicycle pedal, the first rear attachment portion of the second bicycle shoe cleat further includes a second low release force engagement surface arranged on a first side of a front to rear center longitudinal axis of the second bicycle shoe cleat, and a second high release force engagement surface arranged on a second side of a front to rear center longitudinal axis of the second bicycle shoe cleat, the second low release force engagement surface being configured to selectively engage an inside section of the rear clamping member of the right bicycle pedal and move the rear clamping member of the right bicycle pedal upon application of the first predetermined amount of outward twisting force on the second bicycle shoe cleat relative to the right bicycle pedal, the second high release force engagement surface being configured to selectively engage an inside section of the rear clamping member of the left bicycle pedal and move the rear clamping member of the left bicycle pedal upon application of the second predetermined amount of outward twisting force on the second bicycle shoe cleat relative to the v bicycle pedal.

* * * * *